(12) United States Patent
Nagura

(10) Patent No.: US 9,417,101 B2
(45) Date of Patent: Aug. 16, 2016

(54) OPTICAL ENCODER WITH A SCALE THAT HAS FINE AND COARSE PITCH PATTERNS

(75) Inventor: Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/404,313

(22) Filed: Feb. 24, 2012

(65) Prior Publication Data

US 2012/0217384 A1 Aug. 30, 2012

(30) Foreign Application Priority Data

Feb. 28, 2011 (JP) ................. 2011-042073

(51) Int. Cl.
   *G01D 5/34* (2006.01)
   *G01D 5/347* (2006.01)
(52) U.S. Cl.
   CPC .......... *G01D 5/34746* (2013.01); *G01D 5/3473* (2013.01); *G01D 5/34784* (2013.01)
(58) Field of Classification Search
   CPC .......... G01D 5/34746; G01D 5/34784; G01D 5/3473
   USPC ....................... 250/231.13–231.18
   See application file for complete search history.

(56) References Cited

U.S. PATENT DOCUMENTS

| | | | | |
|---|---|---|---|---|
| 3,757,128 A | * | 9/1973 | Vermeulen | ............... 250/231.16 |
| 7,608,813 B1 | | 10/2009 | Milvich | |
| 2001/0017349 A1 | * | 8/2001 | Holzapfel et al. | ....... 250/231.13 |
| 2009/0321520 A1 | | 12/2009 | Martenson | |

FOREIGN PATENT DOCUMENTS

| | | |
|---|---|---|
| EP | 2093543 A2 | 8/2009 |
| JP | 01-113616 A | 5/1989 |
| JP | 2007-183116 A | 7/2007 |
| JP | 2009-198318 A | 9/2009 |

* cited by examiner

*Primary Examiner* — Tony Ko
(74) *Attorney, Agent, or Firm* — Canon U.S.A., Inc. IP Division

(57) ABSTRACT

An optical encoder includes a light source, a scale which is irradiated by the light source and has a fine pitch pattern and a coarse pitch pattern in a measuring direction in one track, a high resolution detection sensor array which receives light from the scale and detects the fine pitch pattern, and a low resolution detection sensor array which receives light from the scale and detects the coarse pitch pattern. A transmittance distribution or a reflectivity distribution of the scale is a distribution obtained by summing up a modulation component which corresponds to the fine pitch pattern and in which integrated values in a direction perpendicular to the measuring direction form modulation amplitude uniform in the measuring direction and a modulation component which corresponds to the coarse pitch pattern and in which modulation amplitude is uniform in the measuring direction.

16 Claims, 18 Drawing Sheets

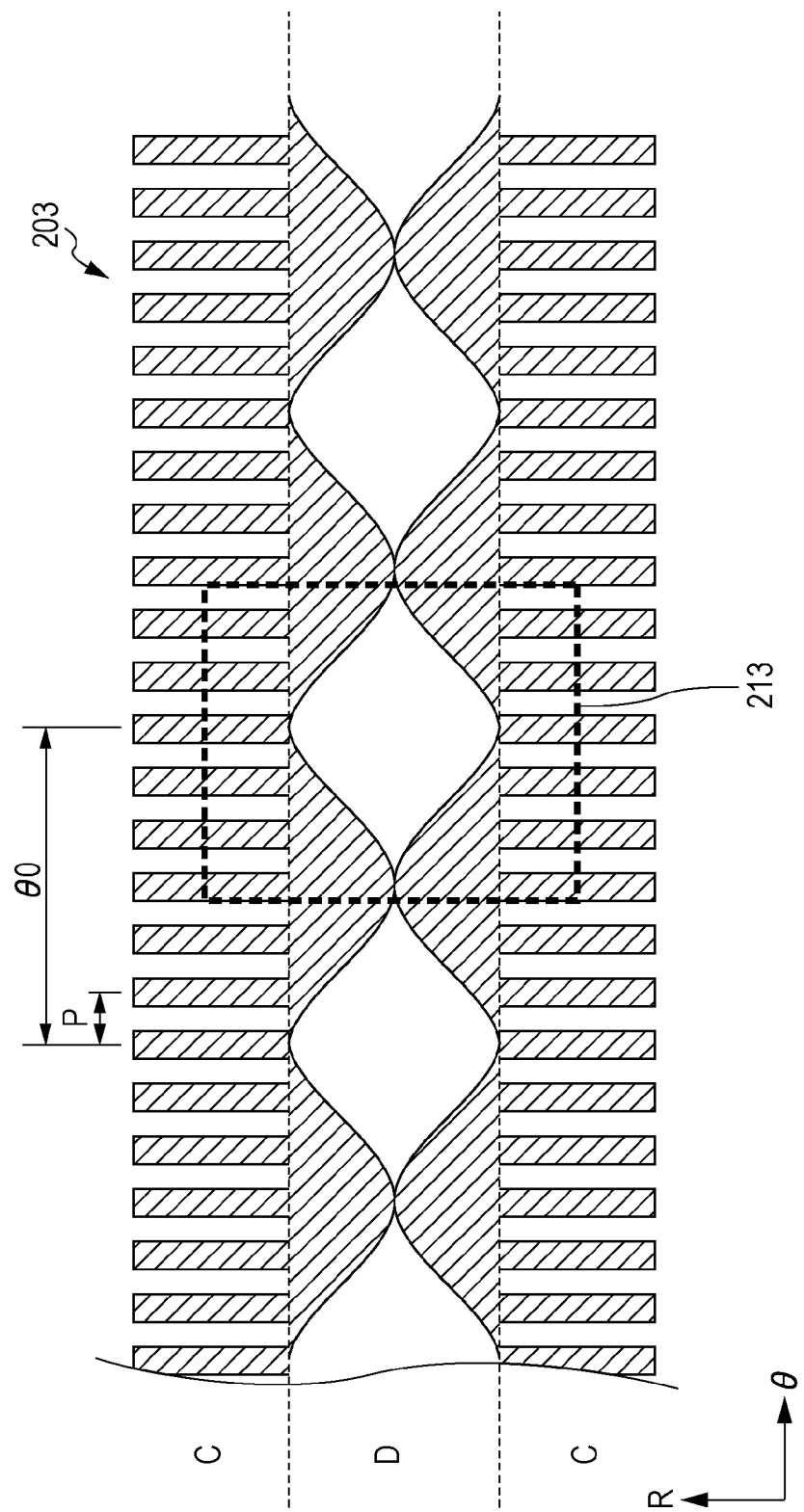

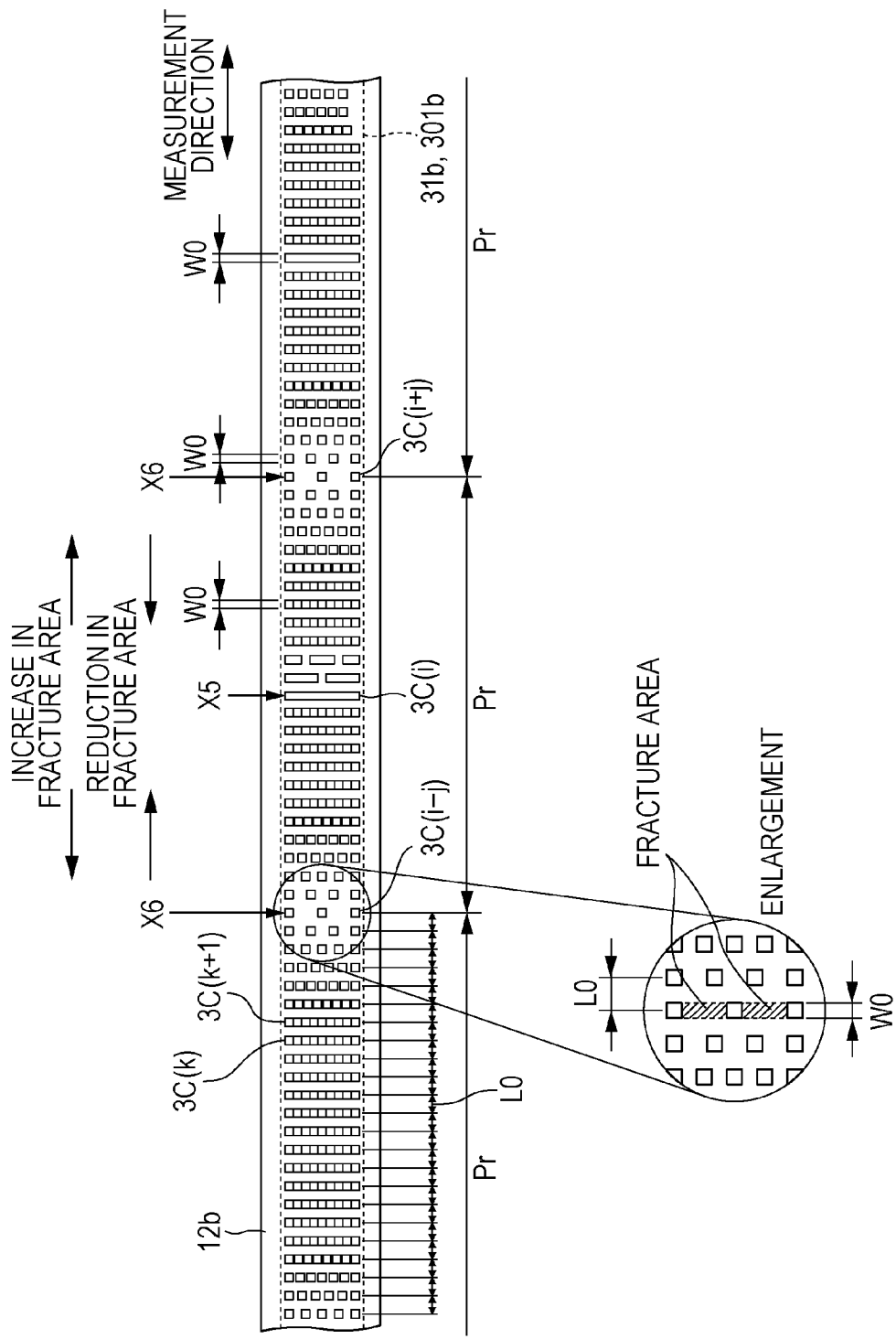

ent invention relates to an optical encoder that
OPTICAL ENCODER WITH A SCALE THAT HAS FINE AND COARSE PITCH PATTERNS

BACKGROUND OF THE INVENTION

1. Field of the Invention

The present invention relates to an optical encoder that detects a position in a linear direction or a rotational direction.

2. Description of the Related Art

Conventionally, an encoder is used to detect position in a machine tool, a factory automation machine, and the like. A position detection method of encoder is divided roughly into an incremental method for measuring a relative moving distance, which is a relative value of a position, and an absolute method for detecting an absolute value of a position. Although the configuration of the incremental method is simple, there are problems that position information is lost when power is turned off and errors are accumulated by exogenous noise. On the other hand, an encoder of the absolute method is generally highly accurate without errors being accumulated, and has an advantage that it is not necessary to move to a home position even when power is turned off.

For example, an encoder of the absolute method, which can output an absolute value as well as a relative value related to a position in the measuring direction, has a configuration as shown in FIG. 19 (EP2093543). According to this example, a large amount of information can be obtained from a small number of scale tracks by forming a plurality of modulations having different pitches in a scale pattern on one track in order to output a relative value.

When performing analysis on the basis of the prior example, it is found that a light intensity distribution, which is reflected from a scale including a plurality of modulation pitches, includes unnecessary spatial frequency components that may cause errors in position detection. Specifically, in the prior example, although the light intensity distribution corresponds to a sum of a modulation component A corresponding to a fine pitch pattern and a modulation component B corresponding to a coarse pitch pattern, the light intensity distribution includes unnecessary spatial frequency components (A+B, A−B, and further, components due to unnecessary diffracted light) that may cause errors in position detection. By the effect of the above, an error from an ideal sine wave occurs. As a result, there is a problem that a position detection error occurs when converting the sine wave into a position signal by an arctangent calculation.

SUMMARY OF THE INVENTION

The present invention provides an optical encoder including a light source, a scale which is irradiated by the light source and has a fine pitch pattern and a coarse pitch pattern in a measuring direction in one track, a high resolution detection sensor array which receives light from the scale and detects the fine pitch pattern, and a low resolution detection sensor array which receives light from the scale and detects the coarse pitch pattern. A transmittance distribution or a reflectivity distribution of the scale is a distribution obtained by summing up a modulation component which corresponds to the fine pitch pattern and in which integrated values in a direction perpendicular to the measuring direction form modulation amplitude uniform in the measuring direction and a modulation component which corresponds to the coarse pitch pattern and in which modulation amplitude is uniform in the measuring direction.

Further features of the present invention will become apparent from the following description of exemplary embodiments with reference to the attached drawings.

BRIEF DESCRIPTION OF THE DRAWINGS

FIG. 17 is an enlarged diagram of a part of a radial track according to the fourth embodiment.

FIG. 19 is a diagram showing a conventional technique.

DESCRIPTION OF THE EMBODIMENTS

Therefore, in view of the above problem, the present invention provides an optical encoder that can detect a plurality of pieces of information from one track with a high degree of accuracy.

First Embodiment

Figure 2:
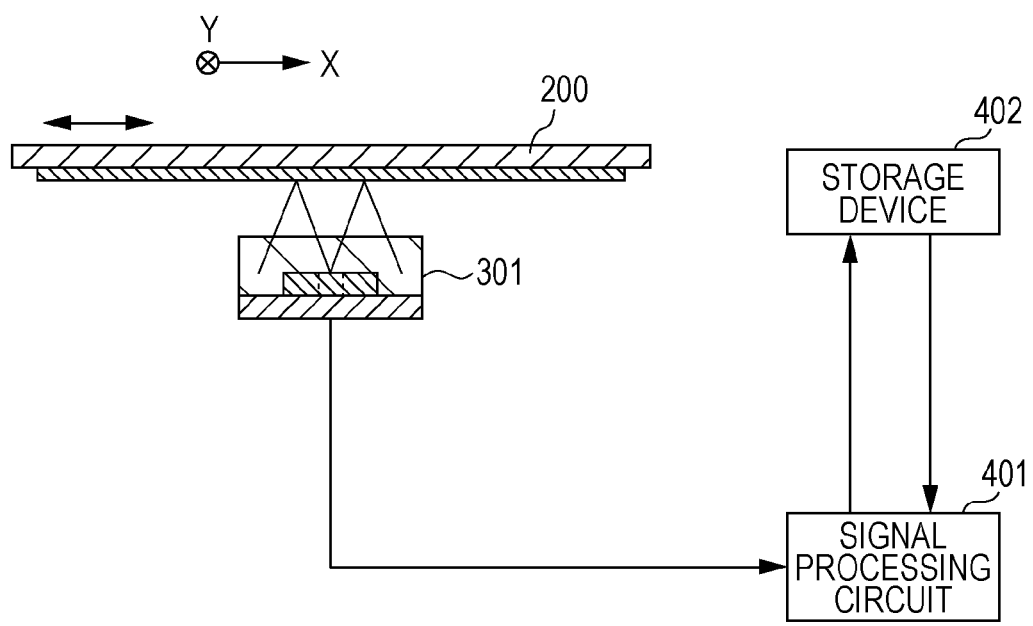
FIG. 2 is a schematic diagram showing a configuration of an optical encoder according to the first embodiment of the present invention.

The present embodiment is an optical encoder of an absolute method that can output a relative value of position as well as an absolute value of position. FIG. 2 shows a configuration of the optical encoder of the present embodiment. The encoder includes a scale 200 attached to a movable portion, a sensor unit 301 attached to a fixed portion, a signal processing circuit 401, and a storage device 402. The signal processing circuit 401 performs interpolation processing of the encoder signal obtained by the sensor unit 301, reads and writes a signal from and to a storage device 402, and outputs a position signal.

Figure 4:
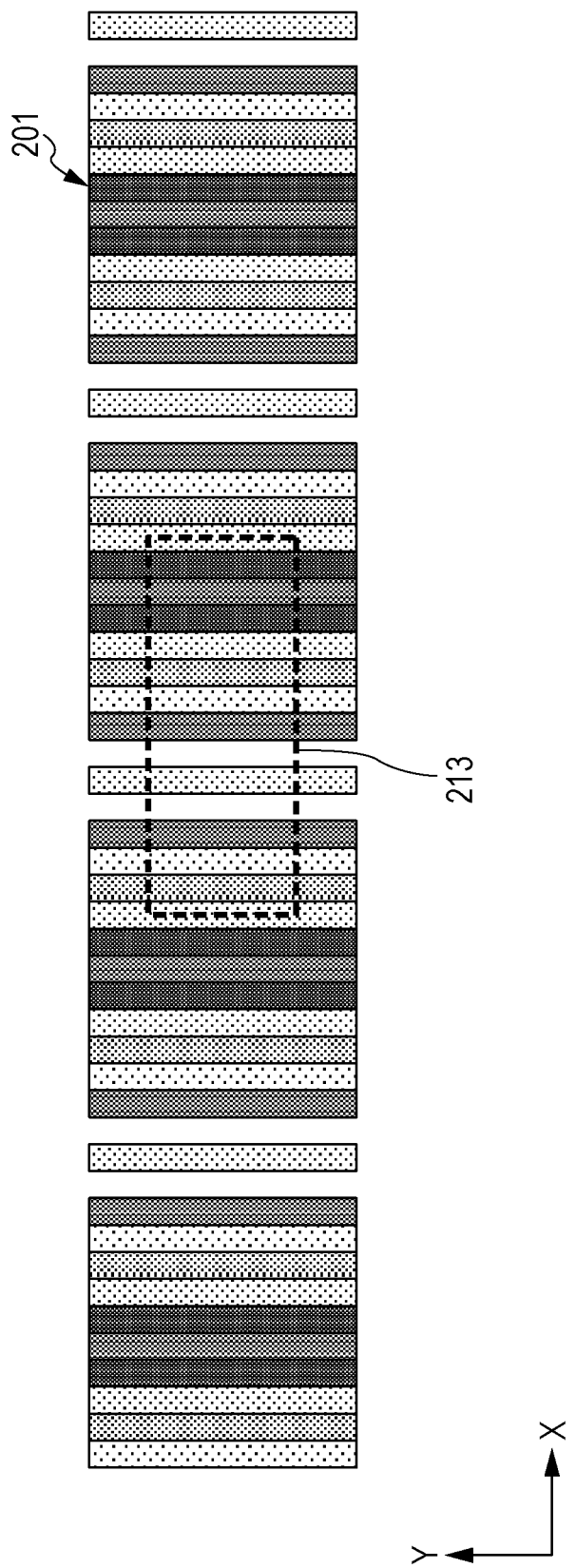
FIG. 4 is a plan view for explaining a configuration of one track of a scale of the sensor unit.
Figure 5:
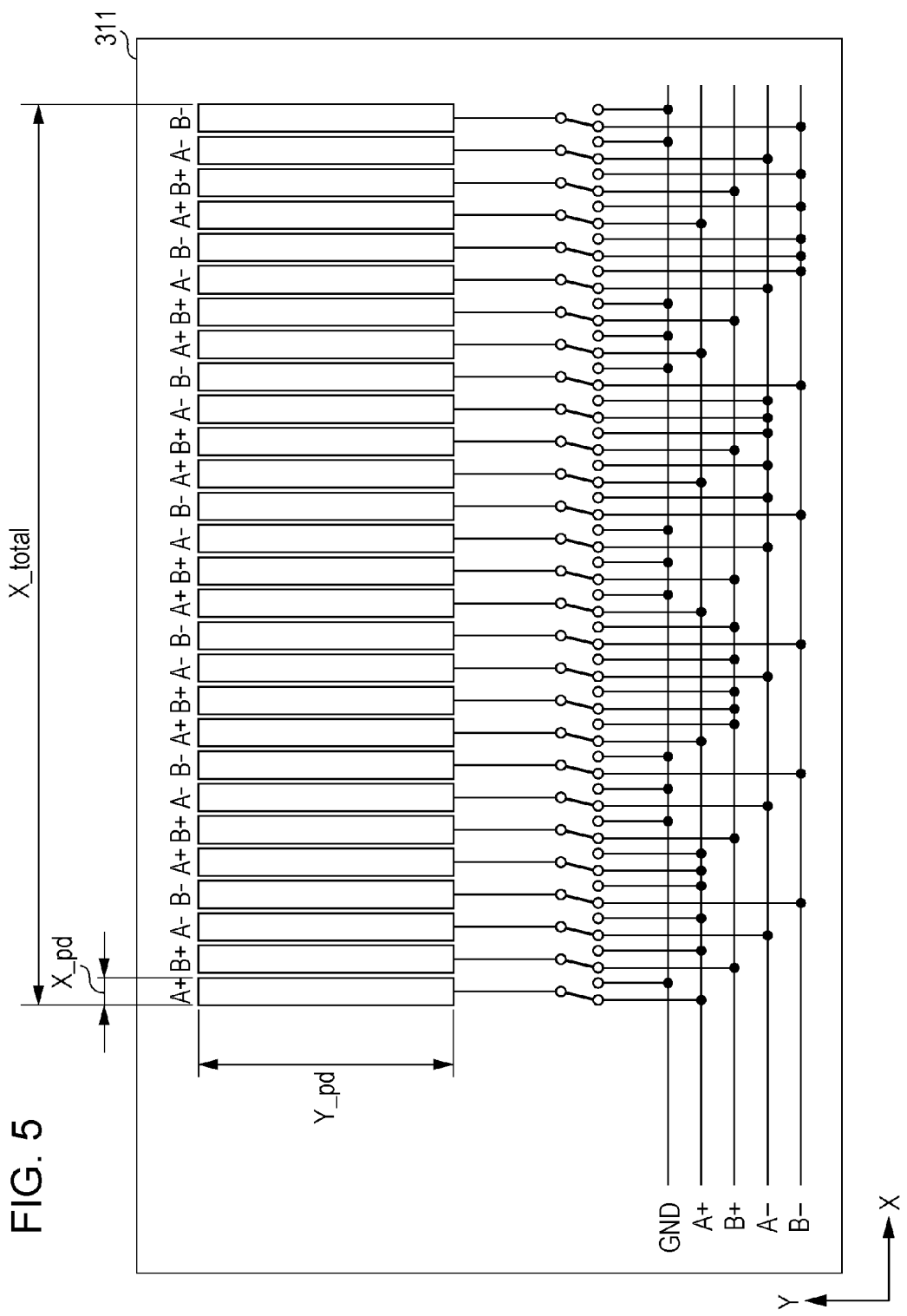
FIG. 5 is a plan view showing an arrangement of a light receiving surface of a photodiode array in high-resolution detection mode.
Figure 6:
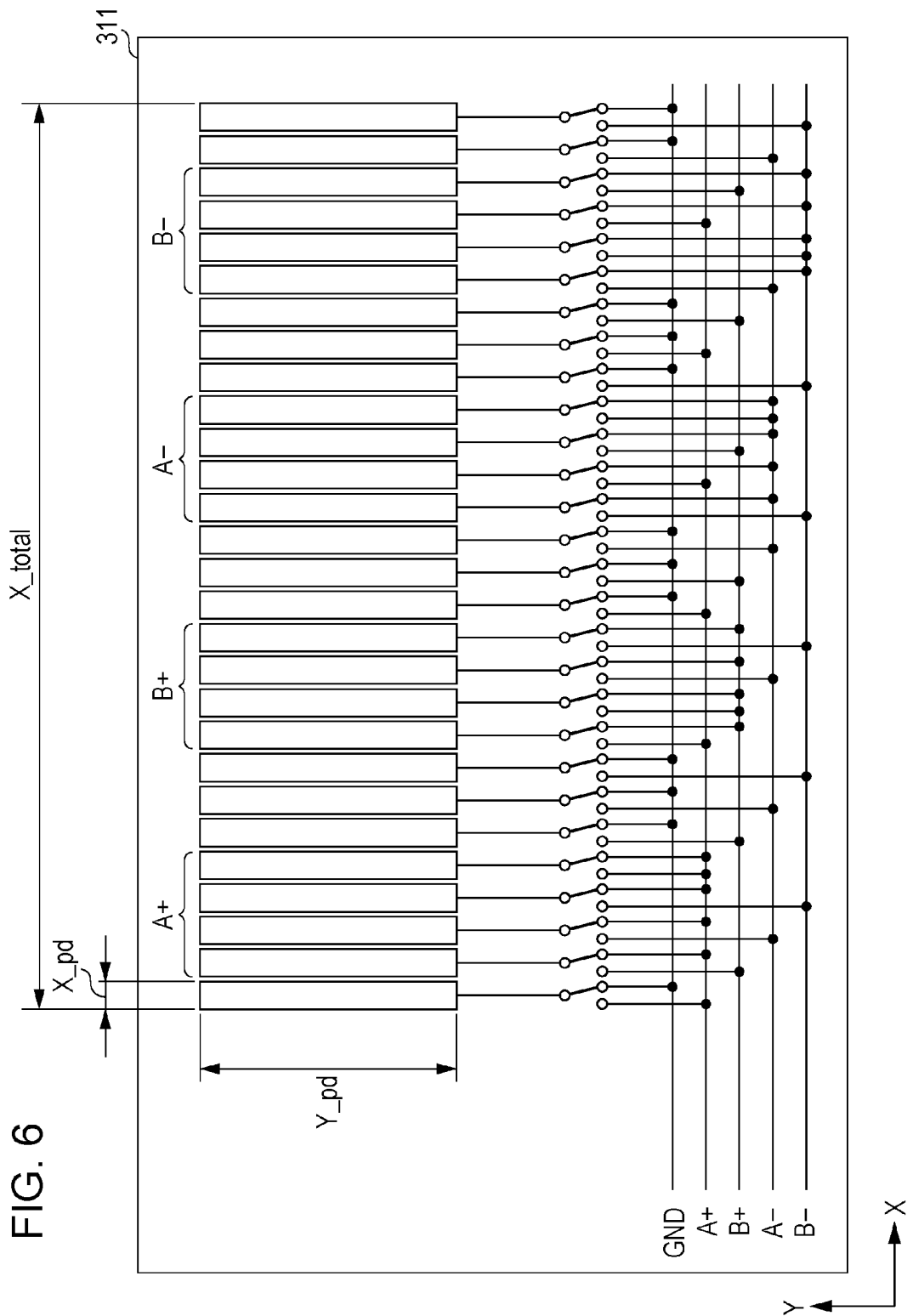
FIG. 6 is a plan view showing an arrangement of a light receiving surface of a photodiode array in low-resolution detection mode.

To obtain a relative value output related to a position in order to measure a relative moving distance, a pair of a slit track 201 as shown in FIG. 4 and a photodiode array 311 as shown in FIGS. 5 and 6 may be used. The slit track 201 includes a fine pitch pattern and a coarse pitch pattern in one track. The photodiode array 311 is a common photodiode array used to detect both the fine pitch pattern and the coarse pitch pattern. However, separate photodiode arrays can be used to detect the fine pitch pattern and the coarse pitch pattern on the slit track 201, respectively. Here, the fine pitch pattern is a fine pattern (pattern having a high spatial frequency, pattern having a short special period in the measuring direction) formed on a transparent member (glass substrate, plastic substrate, or the like) such as the slit track. The coarse pitch pattern is a pattern which is also formed on the slit track and is coarser than the fine pitch pattern (pattern having a low spatial frequency, pattern having a long special period in the measuring direction). The pitch means a spatial period in the fine pitch pattern and the coarse pitch pattern.

To detect an absolute position, in addition to the slit track 201 and the photodiode array 311 for measuring a relative moving distance, further, a slit track 202 and a photodiode array 312 are used. That is, two pairs of slit tracks and photodiode arrays are used. The slit track 202 and the photodiode array 312 have pitches slightly shifted from those of the slit track 201 and the photodiode array 311, so that it is possible to detect an absolute position. Here, the slit track (fine pattern and coarse pattern) 201 and the slit track (another fine pattern and another coarse pattern) 202 are formed on different scales, however, it is not limited to this. The slit track 201 and the slit track 202 may be formed on different locations on the same scale. The pitches of the fine pattern and another fine pattern are slightly (3% to 20%) different from each other, and the pitches of the coarse pattern and another coarse pattern are also slightly (3% to 20%) different from each other. Here, the absolute position is a (relative) position of the slit track (scale on which a pattern is formed) with respect to the photodiode array (photoelectric conversion sensor) or the light source. A relative position (relative value, relative moving distance) indicates the amount of change and the direction of change per unit of time of the position of the slit track with respect to the photodiode array. In other words, the relative position indicates the amount of movement and the direction where the slit track moves with respect to the photodiode array for each sampling period. Of course, the relationship between the photodiode array and the slit track can be replaced by the relationship between an object to which the photodiode array is attached (for example, a lens barrel) and an object to which the slit track is attached (a moving object such as a lens group that moves during zooming).

Figure 3A:
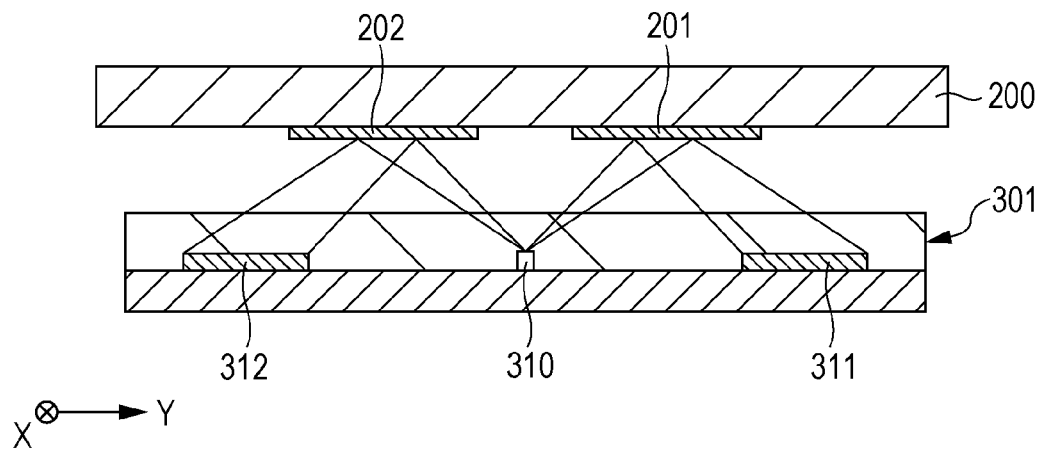
FIG. 3A is a side view showing a schematic configuration of a sensor unit.
Figure 3B:
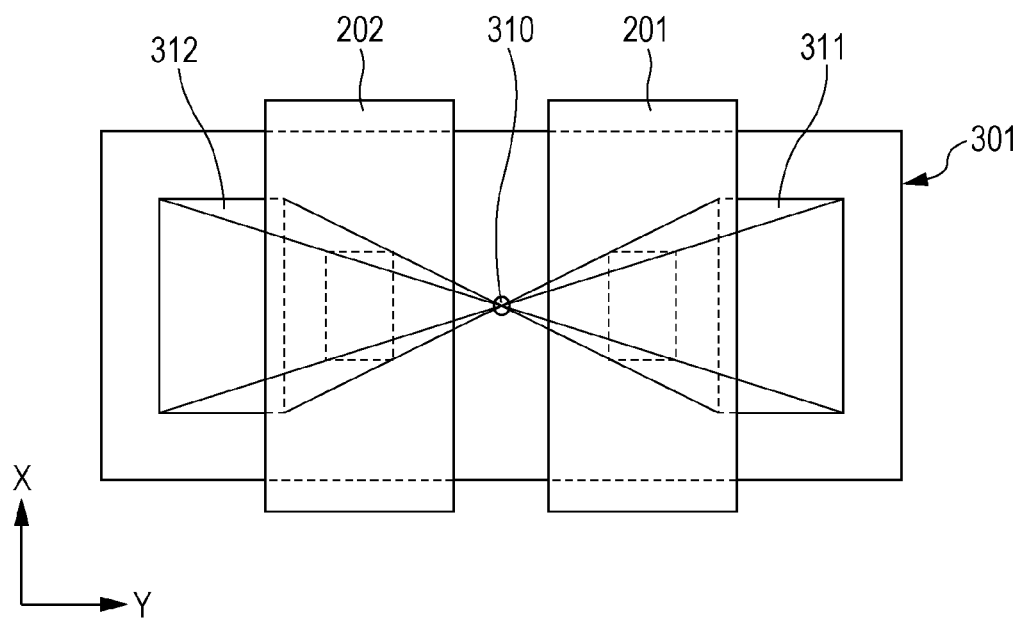
FIG. 3B is a top view showing a schematic configuration of the sensor unit.

A specific configuration of the sensor unit 301 will be described with reference to FIGS. 3A and 3B. FIG. 3A is a side view of the sensor unit 301. FIG. 3B is a top view of the sensor unit 301. The sensor unit 301 is a sensor unit in which an LED 310 working as a light source, the photodiode array 311 working as a sensor array, and the photodiode array 312 working as a sensor array are mounted in the same package so that a light emitting unit and a light receiving unit are integrated into one body. The scale 200 irradiated by the LED 310 is obtained by patterning a chromium reflective film on a glass substrate as two slit tracks 201 and 202. Here, the photodiode arrays 311 and 312 described above include a plurality of sensor elements (pixels). The two photodiode arrays double as a high resolution detection sensor array used in a high resolution detection mode described later and a low resolution detection sensor array used in a low resolution detection mode. In other words, the two photodiode arrays 311 and 312 function as a high resolution detection sensor array and also function as a low resolution detection sensor array. In each detection mode, one or a plurality of sensor elements (pixels) used to form one signal are referred to as a sensor group (pixel group).

A divergent light flux emitted from the LED 310 in the sensor unit 301 is irradiated to a reading area 213 on the first track 201 and the second track 202 of the scale 200. The positions of the reading areas 213 on the top view are areas surrounded by middle points of line segments connecting the LED 310 to four corners of light receiving areas on the photodiode arrays 311 and 312. The light fluxes reflected from the reading areas 213 are respectively directed to the photodiode arrays 311 and 312 in the sensor unit 301.

The LED 310 and the photodiode array 311 are on the same plane in parallel with a plane of the slit tracks 201 and 202. The light flux is emitted from the LED 310, reflected by the slit track 201, and reaches the photodiode array 311. In other words, the slit track 201 is located at the middle position of an optical path from the LED 310 to the photodiode array 311. Thereby, the light fluxes are received on the photodiode arrays 311 and 312 as two times enlarged images of the reflectivity distributions of the slit tracks 201 and 202. The light fluxes received by the photodiode array 311 and the photodiode array 312 are converted into electrical signals and transmitted to the signal processing circuit 401 shown in FIG. 2 as encoder signals.

Scale Including a Fine Pitch Pattern and a Coarse Pitch Pattern

FIG. 4 shows an enlarged diagram of a part of the first track 201 and the second track 202 of the scale 200. The first track 201 is uniform in a direction (Y axis direction) perpendicular to the measuring direction (moving direction) and is divided into different areas having a width of 50 µm in the measuring direction (X axis direction). Here, "uniform in a direction Y" means that the reflectivity of the first track 201 is uniform in the Y direction. The same thing can be said about the second track 202. Pin holes are formed in each area to penetrate the reflective film so that the areas have the pin holes at fixed densities, respectively. The average reflectivities in each area are set to be different from each other by changing the ratio of an area in which the reflective film is present and an area in which the reflective film is absent.

In the first track 201, the fine pitch pattern has a pitch of 100 µm (the reflection image pitch on the photodiode array 311 is 200 µm which is two times the fine pitch). The coarse pitch pattern has a pitch of 700 µm (the reflection image pitch on the photodiode array 311 is 1400 µm which is two times the coarse pitch). On the other hand, in the second track 202, the fine pitch pattern has a pitch of 102.08333 µm (the reflection image pitch on the photodiode array 312 is 204.16666 µm which is two times the fine pitch). The coarse pitch pattern has a pitch of 714.58333 µm (the reflection image pitch on the photodiode array 312 is 1429.16666 µm which is two times the coarse pitch).

Figure 1:
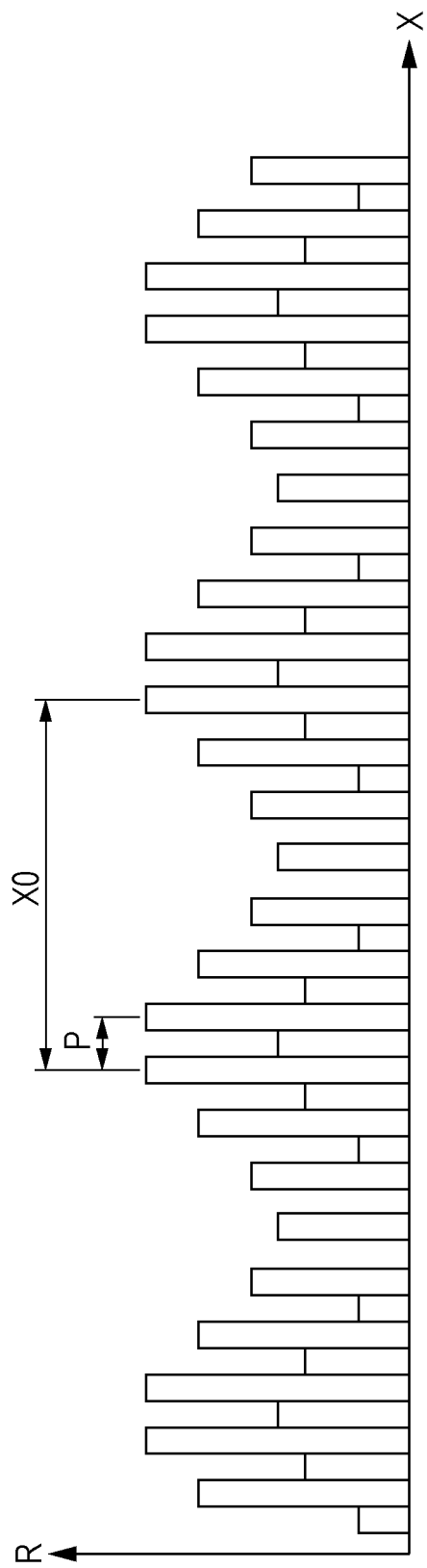
FIG. 1 is a diagram showing a reflectivity distribution of a scale according to a first embodiment of the present invention.

In the first track 201 and the second track 202, the average reflectivity distributions in the measuring direction (X-direction) are formed as described below. As shown in FIG. 1, a reflectivity pattern is formed by adding a reflectivity modulation of average reflectivity difference of 30% at 700 μm pitch (coarse pitch X0) to a reflectivity modulation of average reflectivity difference of 30% at 100 μm pitch (fine pitch P). The coarse pitch pattern mentioned above indicates a lower portion of FIG. 1 excluding the narrow pattern (narrow stripe pattern located in an upper portion in FIG. 1). The fine pitch pattern indicates the narrow pattern in FIG. 1 (narrow stripe pattern located in an upper portion in FIG. 1). FIG. 1 shows the variation of reflectivity (vertical axis R) which is a sum of the coarse pitch pattern in which "change of reflectivity and change of transmittance" are repeated for each spatial period X0 shown in FIG. 1 and the fine pitch pattern in which "change of reflectivity and change of transmittance" are repeated for each spatial period P. FIG. 4, described above, shows the first track having the variation of reflectivity, which is a sum of the two spatial periods shown in FIG. 1, by grayscale image. In other words, the reflectivity distribution of the scale is a distribution obtained by summing up a modulation component which corresponds to the fine pitch pattern and in which integrated values in a direction perpendicular to the measuring direction form modulation amplitude uniform in the measuring direction and a modulation component which corresponds to the coarse pitch pattern and in which modulation amplitude is uniform in the measuring direction. In other words, a value obtained by integrating the reflectivity in a direction perpendicular to the measuring direction periodically changes in the measuring direction, and it means that the periodic change is uniform (substantially uniform). In summary, it means that the uniform (substantially uniform) change of reflectivity (modulation amplitude) is repeated. Here, the modulation amplitude is an amount of change in the reflectivity or the transmittance of the pattern (amplitude when the change of the reflectivity or the transmittance is assumed to be an oscillation). Although it is described that modulation amplitude is uniform in the measuring direction, the modulation amplitude has not necessarily to be uniform, but can vary by several percent (about 5%, preferably 3% or less). The word "uniform" used in the present embodiment allows the modulation amplitude and the like to include some error (variation of about 5%). The modulation component means variation of reflectivity (or transmittance) (reflectivity distribution) in a pattern, and the scale has variation of reflectivity (or transmittance), which is a (calculated) sum of variation of reflectivity required for the fine pattern and variation of reflectivity required for the coarse pattern.

Specifically, for every 50 μm in the X-direction, areas of the reflective film, which respectively have average reflectivities of 30%, 0%, 36%, 10.8%, 49.2%, 24%, 60%, 30%, 60%, 24%, 49.2%, 10.8%, 36%, and 0%, are sequentially arranged in this order. Components of the reflectivity modulation of 100 μm pitch (fine pitch P) are 30%, 0%, 30%, 0%, 30%, 0%, 30%, 0%, 30%, 0%, 30%, 0%, 30%, and 0%. The difference between the maximum reflectivity and the minimum reflectivity in one pitch, which corresponds to the modulation amplitude, is 30%, so that the modulation amplitudes in each pitch in the measuring direction are the same.

On the other hand, components of the reflectivity modulation of 700 μm pitch (coarse pitch X0) are 0%, 0%, 6%, 10.8%, 19.2%, 24%, 30%, 30%, 30%, 24%, 19.2%, 10.8%, 6%, and 0%. The difference between the maximum reflectivity and the minimum reflectivity in one pitch, which corresponds to the modulation amplitude, is 30%, so that the modulation amplitudes in each pitch in the measuring direction are the same.

Here, as a reflectivity distribution of the first track 201 in an arbitrary position in the measuring direction (X-direction), an integration in the Y-direction in a range of a Y-direction width in the reading area 213 is calculated. The result is a sum of a modulation component of 100 μm pitch (fine pitch P) in which the modulation amplitude is constant in the measuring direction and a modulation component of 700 μm pitch (coarse pitch X0) in which the modulation amplitude is constant in the measuring direction.

Similarly, in the second track 202, an average reflectivity distribution in the measuring direction (X-direction) is a sum of the reflectance modulation of the fine pitch and the reflectance modulation of the coarse pitch. In summary, as described above, the second track 202 has pitches slightly different from those of the first track 201 and has average reflectivity differences of 30% in the same manner as the first track 201.

Photodiode Array Capable of Switching Detection Resolution

Next, an output signal of an encoder will be described. FIGS. 5 and 6 show a light receiving surface arrangement of the photodiode array 311. The light receiving surface of the photodiode array 311 is arranged to be 200 μm pitch when detecting a fine pitch pattern (high-resolution detection mode) and arranged to be 1400 μm pitch when detecting a coarse pitch pattern (low-resolution detection mode). The arrangement of the light receiving surface of the photodiode array 312 is the same as that of the photodiode array 311. The photodiode array 311 has 28 photodiodes in a row at 50 μm pitch in the X axis direction. One photodiode has an X-direction width X_pd of 50 μm and a Y-direction width Y_pd of 800 μm. The total width X_total of the photodiode array 311 is 1400 μm.

A total light receiving width of the sensor array for detecting a fine pitch pattern in the measuring direction is set to an integral multiple (here, 1 multiple) of a light receiving width of the sensor array, which detects a coarse pitch pattern and which corresponds to the pitch of the coarse pitch pattern, in the measuring direction. The details of the above will be described later. Each light receiving width for detecting a coarse pitch pattern in the measuring direction is set to an integral multiple (here, 1 multiple) of each light receiving width of the sensor array, which detects a fine pitch pattern and which corresponds to the pitch of the fine pitch pattern of the scale, in the measuring direction.

Thereby, when detecting the fine pitch pattern, one pitch of the coarse pattern is included and outputs are summed up, so that the effect of the coarse pitch pattern can be eliminated. Similarly, when detecting the coarse pitch pattern, one pitch of the fine pattern is included and outputs are summed up, so that the effect of the fine pitch pattern can be eliminated.

The outputs from each of the photodiodes are connected to one of four IV conversion amplifiers in the next stage via the switch circuit. The outputs from the four IV conversion amplifiers respectively correspond to S(A+), S(B+), S(A−), and S(B−) of four-phase sine wave outputs. The reason to use four-phase sine wave outputs is to obtain a signal in which a direct-current component is removed and amplitude is doubled and to be able to determine a moving direction. The switch circuit can switch connections by an input from the outside.

When the input to the switch circuit is high-level, as shown in FIG. 5, the high resolution detection mode is set and a detection pitch for a scale pattern 100 μm (reflection image pitch of 200 μm) is set. On the other hand, when the input to the switch circuit is low-level, as shown in FIG. 6, the low resolution detection mode is set and a detection pitch for a scale pattern 700 μm (reflection image pitch of 1400 μm) is set. In summary, the photodiode array 311 has a first width 100 μm and a first pitch 200 μm in the measuring direction in the high resolution detection mode (FIG. 5) and a second width 400 μm and a second pitch 1400 μm in the measuring direction in the low resolution detection mode (FIG. 6). Here, the first width and the first pitch are the width in the measuring direction of one or more sensor elements (pixels) used to detect one signal when operating in the high resolution detection mode and the spatial period in which the one or more sensor elements are arranged in the measuring direction, respectively. The second width and the second pitch correspond to the first width and the first pitch when operating in the low resolution detection mode.

Low Resolution Detection Mode

At a detection pitch of 700 μm in the low resolution detection mode, every four adjacent photodiodes are electrically connected. In other words, here, four adjacent photodiodes (a plurality of photodiodes) are assumed to be one photodiode (one sensor element, pixel) and a signal from the four adjacent photodiodes is processed. In the high resolution detection mode described later, a signal from photodiodes, the number of which is smaller than that in the low resolution detection mode, is assumed to be one signal and processed. Thereby, outputs of each of A+, B+, A−, and B− in FIG. 6 are summed up in the width of 200 μm which corresponds to the reflection image pitch of the modulation component of the scale pattern of 100 μm pitch, so that it is possible to reduce effects of the modulation component of 100 μm pitch which affect the output.

Although the fine pitch of the second track 202 is 102.08333 μm (reflection image pitch is 204.16666 μm), every four adjacent outputs of each of A+, B+, A−, and B− are summed up in a width of 200 μm which substantially corresponds to the reflection image pitch of the modulation component. Therefore, a sufficient reduction effect of the modulation component can be obtained.

Outputs of unused sensors of the photodiode arrays 311 and 312 that are not used to detect position during the low resolution detection mode are connected to GND (ground) (FIG. 6).

High Resolution Detection Mode

At a detection pitch of 100 μm in the high resolution detection mode, the total width of the photodiodes related to the signals is 1400 μm, which corresponds to the reflection image pitch of the modulation component of the scale pattern of 700 μm. Therefore, it is possible to reduce effects of the fluctuation of the output amplitude that varies due to the modulation component of 700 μm pitch. Thereby, outputs of each of A+, B+, A−, and B−, which are separately arranged in FIG. 5, are summed up in the range of 1400 μm which corresponds to the reflection image pitch of the modulation component of the scale pattern of 700 μm pitch, so that it is possible to reduce effects of the modulation component of 700 μm pitch which affect the output.

Although the coarse pitch of the second track 202 is 714.58333 μm (reflection image pitch is 1429.16666 μm), outputs of each of A+, B+, A−, and B−, which are separately arranged, are summed up in a range of 1400 μm which substantially corresponds to the reflection image pitch of the modulation component. Therefore, a sufficient reduction effect of the modulation component can be obtained. In summary, the difference between the low resolution detection mode described above and the high resolution detection mode is that the number of photodiodes used to form one signal (or the width of the photodiodes in the measuring direction) when the low resolution detection mode is executed is greater than that when the high resolution detection mode is executed. Here, one or more photodiode(s) used to form one signal is referred to as one sensor element (pixel).

Forming Phase Signal

Regarding the relative phases of the four-phase sine wave with respect the detection pitch, if the relative phase of S(A+) is 0 degrees, the relative phase of S(B+) is +90 degrees, the relative phase of S(A−) is +180 degrees, and the relative phase of S(B−) is +270 degrees. The calculations below are performed using these outputs in the signal processing circuit 401 in FIG. 2, so that two-phase sinusoidal wave signals S(A) and S(B) from which a direct-current component is removed are formed. Further a phase signal is obtained by further performing an arctangent calculation on these signals.

$$S(A)=S(A+)-S(A-)$$

$$S(B)=S(B+)-S(B-)$$

Generation Mechanism of Each Frequency Component and Removal of Unnecessary Components Here, generation mechanism of each frequency component and removal of unnecessary components will be described. A diffraction angle distribution from the scale pattern is obtained by Fourier transform of the reflectivity distribution. In the first track 201 of the present embodiment, an average reflectivity distribution in the measuring direction (X-direction) is a sum of the reflectance modulation at the 100 μm pitch in a constant amplitude and the reflectance modulation at the 700 μm pitch in a constant amplitude. Thereby, a main diffraction component is formed of five components, which are the zero-order light, ±1-order diffracted light by the coarse pitch (700 μm pitch), and ±1-order diffracted light by the fine pitch (100 μm pitch).

Regarding these diffracted light beams, the spatial frequency of interference fringes caused by interference between the diffracted light beams is determined by a difference between the diffraction angles of the diffracted light beams interfering with each other. The coarse pitch is seven times the fine pitch, so that the diffraction angle of the fine pitch is seven times the diffraction angle of the coarse pitch. Thereby, if the spatial frequency of two-times enlarged image of the fine pitch is defined as if (the spatial frequency component of if is generated by the interference between the zero-order light and the ±1-order diffracted light by the coarse pitch), the spatial frequency component of 7*f* is generated by the interference between the zero-order light and the ±1-order diffracted light by the fine pitch.

Figure 7:
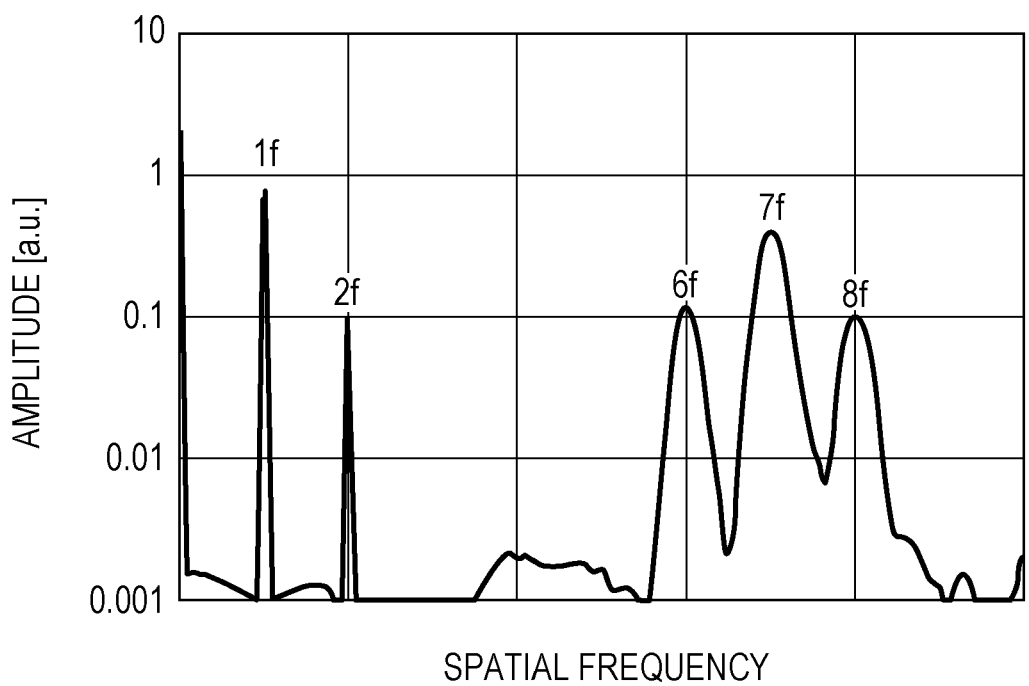
FIG. 7 is a diagram showing a spatial frequency component included in a diffraction image reflected from the scale.

In addition to the spatial frequency component of if and the spatial frequency component of 7*f* that should be detected, unnecessary spatial frequency components 2*f*, 6*f*, 8*f*, and 14*f* are generated. Specifically, the spatial frequency component 2*f* is generated by the interference between the ±1-order diffracted light beams by the coarse pitch, and the spatial frequency component 6*f* is generated by the interference between the +1-order (−1-order) diffracted light beam by the fine pitch and the +1-order (−1-order) diffracted light beam by the coarse pitch. The spatial frequency component 8*f* is generated by the interference between the +1-order (−1-order) diffracted light beam by the fine pitch and the −1-order (+1-order) diffracted light beam by the coarse pitch, and the spatial frequency component 14f is generated by the interference between the ±1-order diffracted light beams by the fine pitch. FIG. 7 shows a spatial frequency component included in a diffraction image reflected from the scale.

Figure 8:
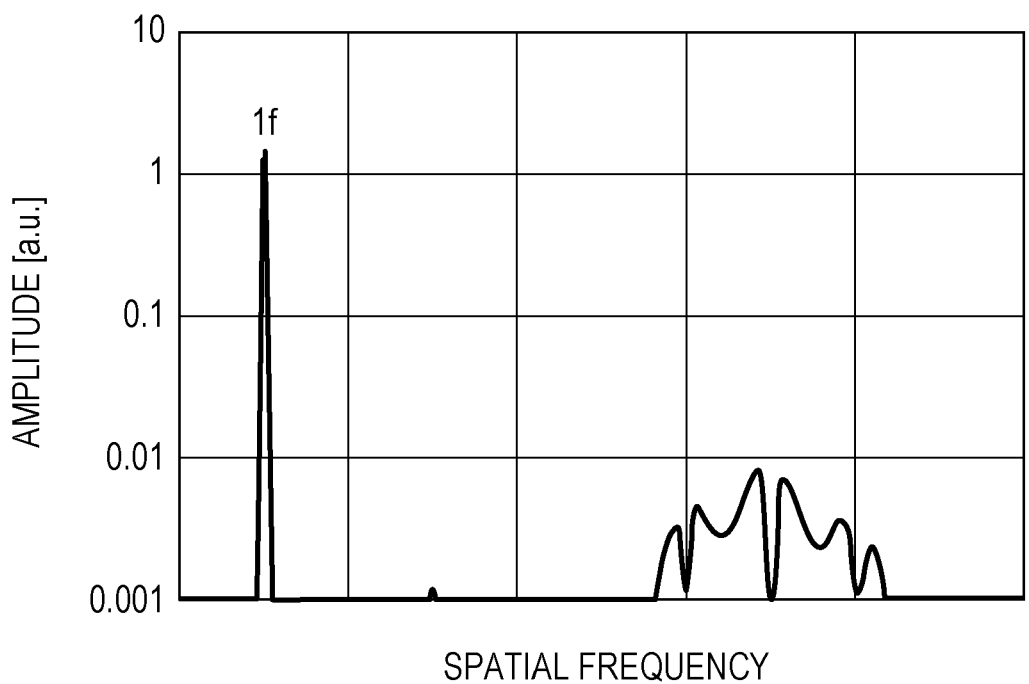
FIG. 8 is a diagram showing a harmonic component included in a sinusoidal wave signal S(A).

FIG. 8 shows a calculation result of a harmonic component included in a sinusoidal wave signal S(A) in the low resolution detection mode (detecting a reflected diffraction image) from the first track 201. From FIG. 8, it is understood that unnecessary frequency components are reduced, there is only the spatial frequency component 1f, and an almost ideal sine wave can be obtained. The removal of the unnecessary components is performed as described below.

In the low resolution detection mode, outputs of four adjacent photodiodes (A+, B+, A−, and B− in FIG. 6) are summed up. Specifically, outputs in the width of 200 μm which corresponds to the reflection image pitch of the modulation component of the scale pattern of 100 μm pitch are summed up, so that it is possible to reduce effects of the modulation component of 100 μm pitch which affect the output. Thereby, the unnecessary component if can be removed.

Further, even-ordered components such as the unnecessary frequency components 2f, 6f, 8f, and 14f are removed by a calculation of S(A)=S(A+)−S(A−) by the signal processing circuit connected to the sensor array. As a result, the unnecessary frequency components are removed and an almost ideal sine wave of if can be obtained. On the second track 202, the pitch is almost the same as that of the first track 201, so that the same effect can be obtained.

In the high resolution detection mode, outputs of seven separate photodiodes of each of A+, B+, A−, and B− in FIG. 5 are summed up. Specifically, outputs of each of A+, B+, A−, and B− in the range of 1400 μm which corresponds to the reflection image pitch of the modulation component of the scale pattern of 700 μm pitch are summed up, so that it is possible to reduce effects of the modulation component of 700 μm pitch which affect the output. Thereby, the unnecessary component if can be removed. Further, the unnecessary frequency components 2f, 6f, and 8f can also be removed by summing up and averaging the outputs of each of A+, B+, A−, and B− in the range of 1400 μm.

Further, the component of the unnecessary frequency component 14f, which is a double frequency wave of 7f, is removed by a calculation of S(A)=S(A+)−S(A−) by the signal processing circuit connected to the sensor array. As a result, the unnecessary frequency components are removed and an almost ideal sine wave of 7f can be obtained. On the second track 202, the pitch is almost the same as that of the first track 201, so that the same effect can be obtained.

Absolute Position Detection

Next, a process for performing absolute position detection will be described. Although the absolute position is detected, the "absolute position" here means a relative position related to at least one direction (including translational direction and rotational direction) with respect to an optical device (camera, lens apparatus, and the like) to which the optical encoder of the present embodiment is attached. However, the "absolute position detection" here is not detection performed by a so-called "relative position sensor", which is a sensor that detects a positional change of an object over time, that is, a sensor that detects an amount of movement per unit time and a direction of movement. Specifically, the absolute position detection described in the present embodiment is position detection which can accurately detect a position of an object with respect to the optical device by using a value measured in one operation. As described above, to perform absolute position detection, the photodiode array 312 that detects the slit track 202 is provided in addition to the photodiode array 311 that detects the slit track 201. The pitch of the second track 202 is slightly different from that of the first track 201, and each of the photodiode arrays 311 and 312 is used as both a high resolution detection sensor array that detects the fine pitch pattern and a low resolution detection sensor array that detects the coarse pitch pattern.

An absolute position signal is synthesized on the basis of phase information from the two pairs of the high resolution detection sensor arrays and the low resolution detection sensor arrays to raise resolution sequentially in order to obtain a further accurate absolute position signal as described below.

When the input to the switch circuit is high (detection pitch is 100 μm), a phase signal of the first track is defined as $\phi 1$ and a phase signal of the second track is defined as $\phi 2$. When the input to the switch circuit is low (detection pitch is 700 μm), a phase signal of the first track is defined as $\phi 1'$ and a phase signal of the second track is defined as $\phi 2'$. Before and after switching the input to the switch circuit, the signals are obtained within a very small time interval, so that $\phi 1$, $\phi 2$, $\phi 1'$, and $\phi 2'$ at the same position can be obtained.

Although the synchronization property degrades when the scale is moving at high-speed, in this case, the synchronization property may be secured by obtaining the signals a plurality of times and averaging phases as described below. Specifically, first, at the detection pitch of 100 μm, S(A+), S(A−), S(B+), and S(B−) are obtained and the input to the switch circuit is switched from high to low. Next, at the detection pitch of 700 μm, S(A+), S(A−), S(B+), and S(B−) are obtained and the input to the switch circuit is switched from low to high. Then, at the detection pitch of 100 μm, S(A+), S(A−), S(B+), and S(B−) are obtained again.

The intervals between the timings of obtaining the signals are substantially the same. An average of the $\phi 1$ and $\phi 2$ obtained at the first time and the $\phi 1$ and $\phi 2$ obtained at the second time is calculated, so that the synchronization property of $\phi 1$ and $\phi 2$ with $\phi 1'$ and $\phi 2'$ can be improved. Phase signals P1, P2, P3, and P4 having periods different from each other are generated by the calculations described below from the phase signals $\phi 1$, $\phi 2$, $\phi 1'$, and $\phi 2'$ obtained in the manner as described above.

$$P1 = \phi 1' - \phi 2'$$

$$P2 = \phi 1 - \phi 2$$

$$P3 = \phi 1'$$

$$P4 = \phi 1$$

P1 is a periodic signal having a period of T1=34.3 mm and is defined as the most significant signal. P2 is a periodic signal having a period of T2=4.9 mm and is defined as the second significant signal. P3 is a periodic signal having a period of T3=0.7 mm and is defined as the third significant signal. P4 is a periodic signal having a period of T4=0.1 mm and is defined as the least significant signal.

Figure 9:
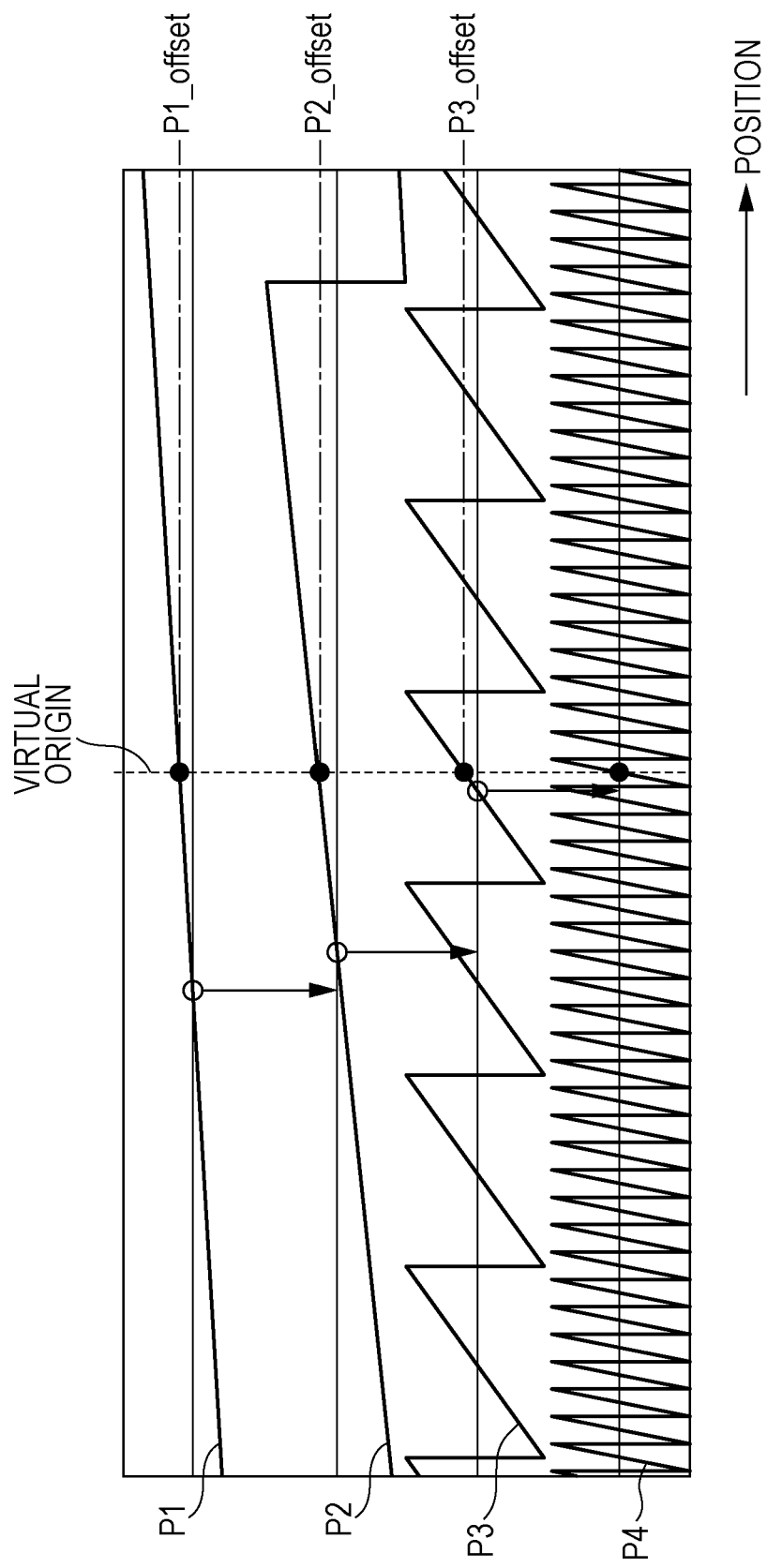
FIG. 9 is a diagram for explaining an initialization operation of an absolute position signal synthesis related to an absolute position detection.

Next, a process of an initialization operation necessary to synthesize an absolute position signal in the present embodiment will be described with reference to FIG. 9. First, the scale 200 is moved in a predetermined direction. Then, the first zero cross of P2 is detected after the zero cross of P1 is passed, and further, the zero cross of P3 immediately after that is detected, and further, the zero cross of P4 immediately after that is detected. Then the zero cross of P4 is set to a virtual origin. Phase signals of P1, P2 and P3 at the virtual origin are defined as P1_offset, P2_offset, and P3_offset respectively.

In the initialization operation, the signal processing circuit 401 writes P1_offset, P2_offset, and P3_offset to the storage device 402. The initialization processing may be performed at any timing, such as, for example, at the time of shipment of the encoder.

Next, a process for synthesizing an absolute position signal from the periodic signals will be described. First, intermediate signals Q1 and Q2 are obtained using P1 to P4 and T1 to T4 described above by the calculations described below.

$$Q1=\text{Round}[(P1-P1\_\text{offset})-(P2-P2\_\text{offset})\times T2/T1]+(P2-P2\_\text{offset})\times T2/T1$$

$$Q2=\text{Round}[Q1-(P3-P3\_\text{offset})\times T3/T1]+(P3-P3\_\text{offset})\times T3/T1$$

Here, Round[ ] is a round-off (rounding) function. Next, an absolute position signal S_abs is obtained as described below.

$$S\_\text{abs}=\text{Round}[Q2-P4\times T4/T1]+P4\times T4/T1$$

The absolute position signal S_abs obtained in this way is outputted from the signal processing circuit 401.

Although the present embodiment uses a linear scale, the same effect can be obtained even when using a rotary scale. Although, in the present embodiment, a plurality of detection pitches are used by sequentially switching the combination of the light receiving surfaces in which outputs are summed up, a plurality of calculation circuits corresponding to the plurality of detection pitches may be provided, and light receiving surfaces respectively corresponding to the detection pitches may be further provided.

As described above, according to the present invention, when detecting a plurality of periodic signals formed on one track, waveforms similar to a sine wave can be obtained from any period, so that it is possible to perform position detection with a high degree of accuracy.

Second Embodiment

Figure 10:
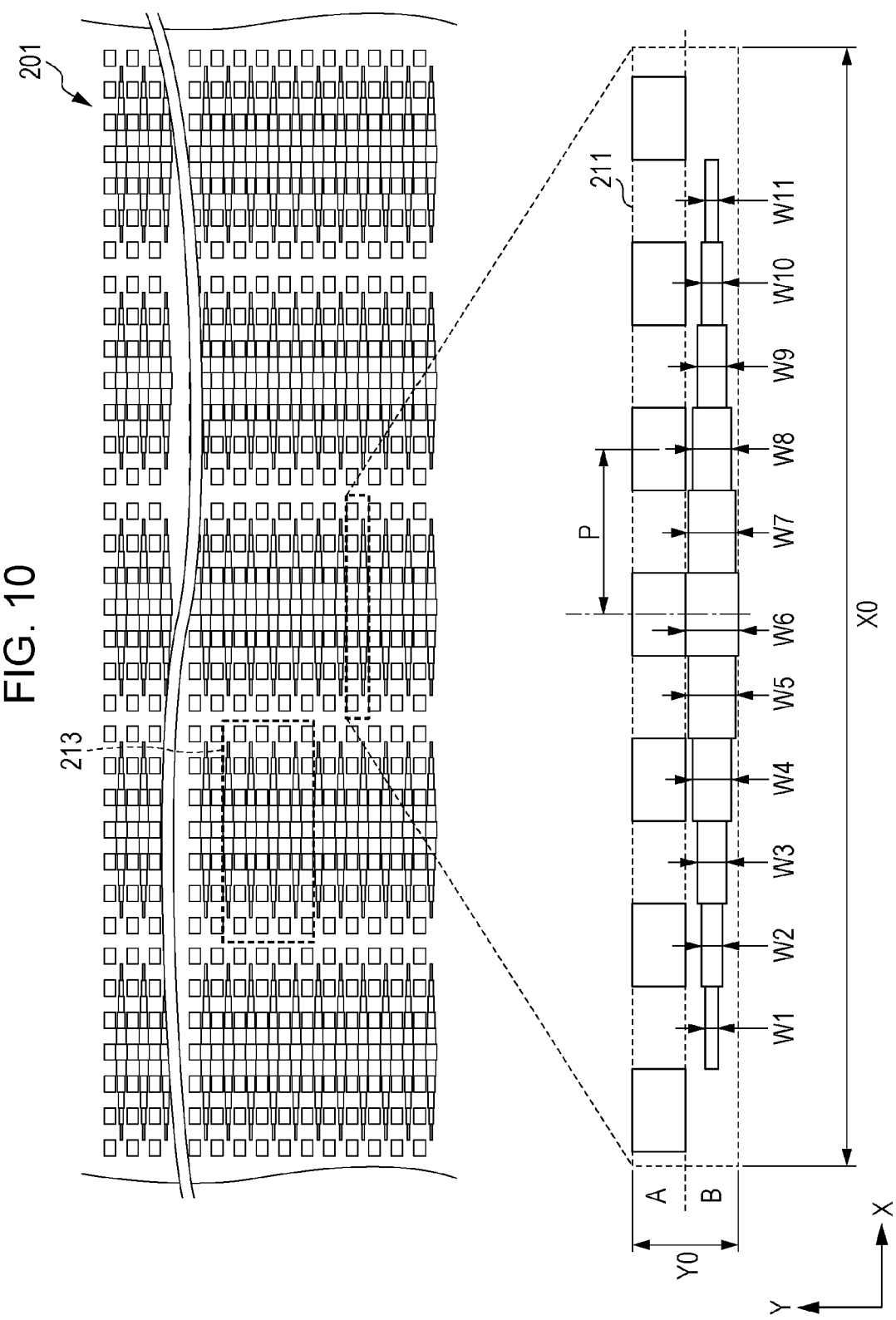
FIG. 10 is a diagram showing a pattern of a scale according to a second embodiment.

In the present embodiment, the pattern of the scale 200 is different from that of the first embodiment. The configuration other than the above and the signal processing are the same as those in the first embodiment, so that the description thereof will be omitted. FIG. 10 shows an enlarged diagram of a part of the first track 201 and the second track 202 of the scale 200. The first track 201 has a pattern in which unit block patterns 211 are periodically arranged in the measuring direction (X axis direction) and a direction (Y axis direction) perpendicular to the measuring direction, respectively. The unit block pattern 211 of the first track 201 has an X-direction width X0 of 700 μm and an Y-direction width Y0 of 50 μm.

The unit block pattern 211 includes an area (area A) of a pattern row in which patterns having an X-direction width of 50 μm are arranged at a pitch P of 100 μm at regular intervals and an area (area B) of a modulation pattern row in which patterns are arranged at a pitch of 700 μm. The area A and the area B have the same width of 25 μm in the Y axis direction. In the area B, eleven reflective patterns each having an X-direction width of 50 μm are arranged in a row. The widths of the reflective patterns in the Y axis direction are as follows: W1=5 μm, W2=9 μm, W3=16 μm, W4=20 μm, W5=25 μm, W6=25 μm, W7=25 μm, W8=20 μm, W9=16 μm, W10=9 μm, and W11=5 μm.

Similarly, the unit block pattern of the second track 202 has an X-direction width X0 of 714.58333 μm and an Y-direction width Y0 of 50 μm. The unit block pattern includes an area (area A) of a pattern row in which patterns having an X-direction width of 51.041667 μm are arranged at a pitch P of 102.08333 μm at regular intervals and an area (area B) of a modulation pattern row in which patterns are arranged at a pitch of 714.58333 μm. The area A and the area B have the same width of 25 μm in the Y axis direction. In the area B, eleven reflective patterns each having an X-direction width of 51.041667 μm are arranged in a row.

The widths of the reflective patterns in the Y axis direction are as follows: W1=5 μm, W2=9 μm, W3=16 μm, W4=20 μm, W5=25 μm, W6=25 μm, W7=25 μm, W8=20 μm, W9=16 μm, W10=9 μm, and W11=5 μm.

Figure 11:
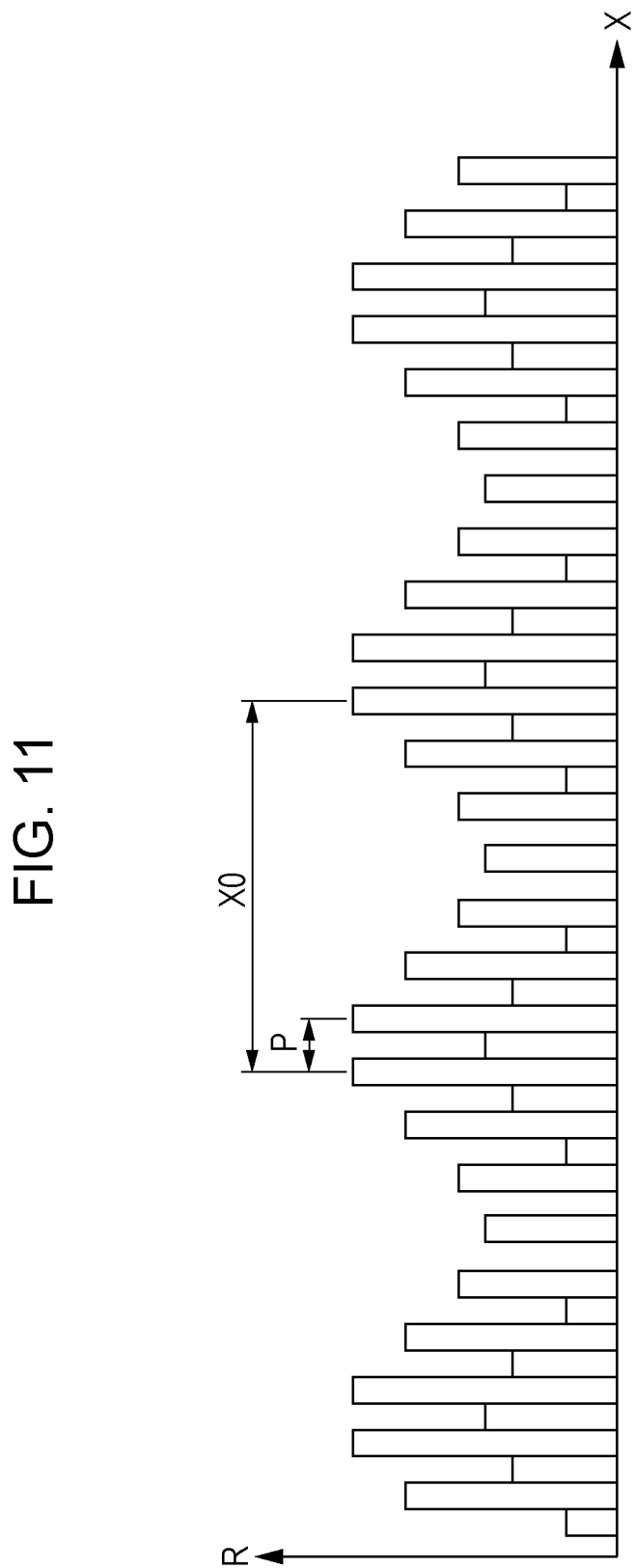
FIG. 11 is a diagram showing a reflectivity distribution of the scale according to the second embodiment.

FIG. 11 shows an X-direction distribution obtained by integrating the reflectivity distribution of the first track 201 in a range of Y-direction width (400 μm) of the reading area 213. In the same manner as in the first embodiment, the integration result is a sum of a modulation component of 100 μm pitch (fine pitch) in which the modulation amplitude is constant in the measuring direction and a modulation component of 700 μm pitch (coarse pitch) in which the modulation amplitude is constant in the measuring direction. In the same manner as the first track 201, the second track 202 has an X-direction distribution which is a sum of a modulation component of 102.08333 μm pitch (fine pitch) in which the modulation amplitude is constant in the measuring direction and a modulation component of 714.58333 μm pitch (coarse pitch) in which the modulation amplitude is constant in the measuring direction.

In the present embodiment, it is possible to obtain the same effect as that of the first embodiment by using scale patterns simpler than those of the first embodiment.

Third Embodiment

Figure 12:
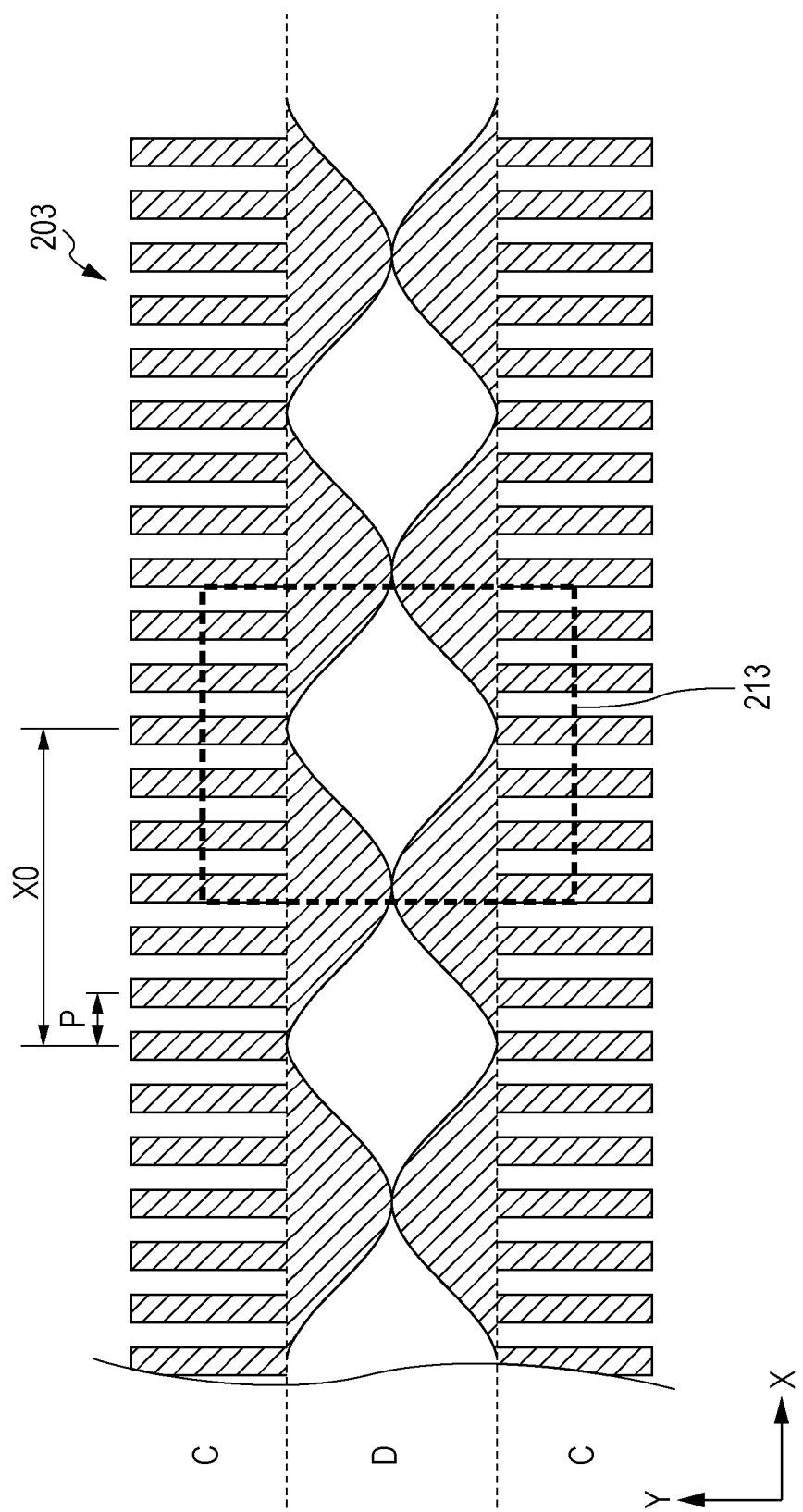
FIG. 12 is a diagram showing a pattern of a scale according to a third embodiment.

In the present embodiment, the pattern of the scale 200 is different from that of the first embodiment. The detection pitch of the sensor is switched between 100 μm and 600 μm. The configuration other than the above and the signal processing are the same as those in the first embodiment, so that the description thereof will be omitted. FIG. 12 shows a scale pattern of the first track 201 and the second track 202 according to the present embodiment.

The first track 201 has areas (areas C) of a pattern row in which patterns having an X-direction width of 50 μm are arranged at a pitch P=100 μm at regular intervals on both sides of the sensor scanning area. Further, the first track 201 has an area (area D) formed of a reflective film pattern in which a boundary line between a reflective portion and a non-reflective portion is formed into a sinusoidal wave shape having a pitch of X0=600 μm in the center portion of the sensor scanning area. The Y-direction width of the area D is 200 μm. The sensor unit 301 is positioned so that the reading area 213 of the sensor unit 301 scans a range including the Y width of the center portion at all times. Here, an integration in the Y-direction in a range of the Y-direction width (400 μm) of the reading area 213 of the sensor unit 301 is calculated.

In the same manner as in the first embodiment, the result is a sum of a modulation component of 100 μm pitch (fine pitch) in which the modulation amplitude is constant in the measuring direction and a modulation component of 600 μm pitch (coarse pitch) in which the modulation amplitude is constant in the measuring direction.

Similarly, the second track 202 has areas (areas C) of a pattern row in which patterns having an X-direction width of 50 μm are arranged at a pitch P=101.4085 μm at regular intervals on both sides of the sensor scanning area. Further, the first track 201 has an area (area D) formed of a reflective film pattern in which a boundary line between a reflective portion and a non-reflective portion is formed into a sinusoidal wave shape having a pitch of X0=608.4507 μm in the center portion of the sensor scanning area. The Y-direction width of the area D is 200 μm. The sensor unit 301 is positioned so that the reading area 213 of the sensor unit 301 scans a range including the Y width of the center portion at all times.

Here, an integration in the Y-direction in a range of the Y-direction width (400 μm) of the reading area 213 of the sensor unit 301 is calculated. In the same manner as in the first embodiment, the result is a sum of a modulation component of 101.4085 μm pitch (fine pitch) in which the modulation amplitude is constant in the measuring direction and a modulation component of 608.4507 μm pitch (coarse pitch) in which the modulation amplitude is constant in the measuring direction.

In the present embodiment, the areas C are separated from the area D in a direction perpendicular to the measuring direction (and in particular the area D is interposed between the areas C), so that it is possible to reduce mutual interference between the ±1-order diffracted light by the coarse pitch (600 μm pitch) and the ±1-order diffracted light by the fine pitch (100 μm pitch). Thereby, an almost ideal sine wave can be obtained even if the ratio of the coarse pitch to the fine pitch is not an odd multiple of 1, which is the ratio in the first embodiment. Further, if the area D is formed of patterns which reflects or transmits light as shown in the second embodiment, the same effects can be obtained.

Figure 13:
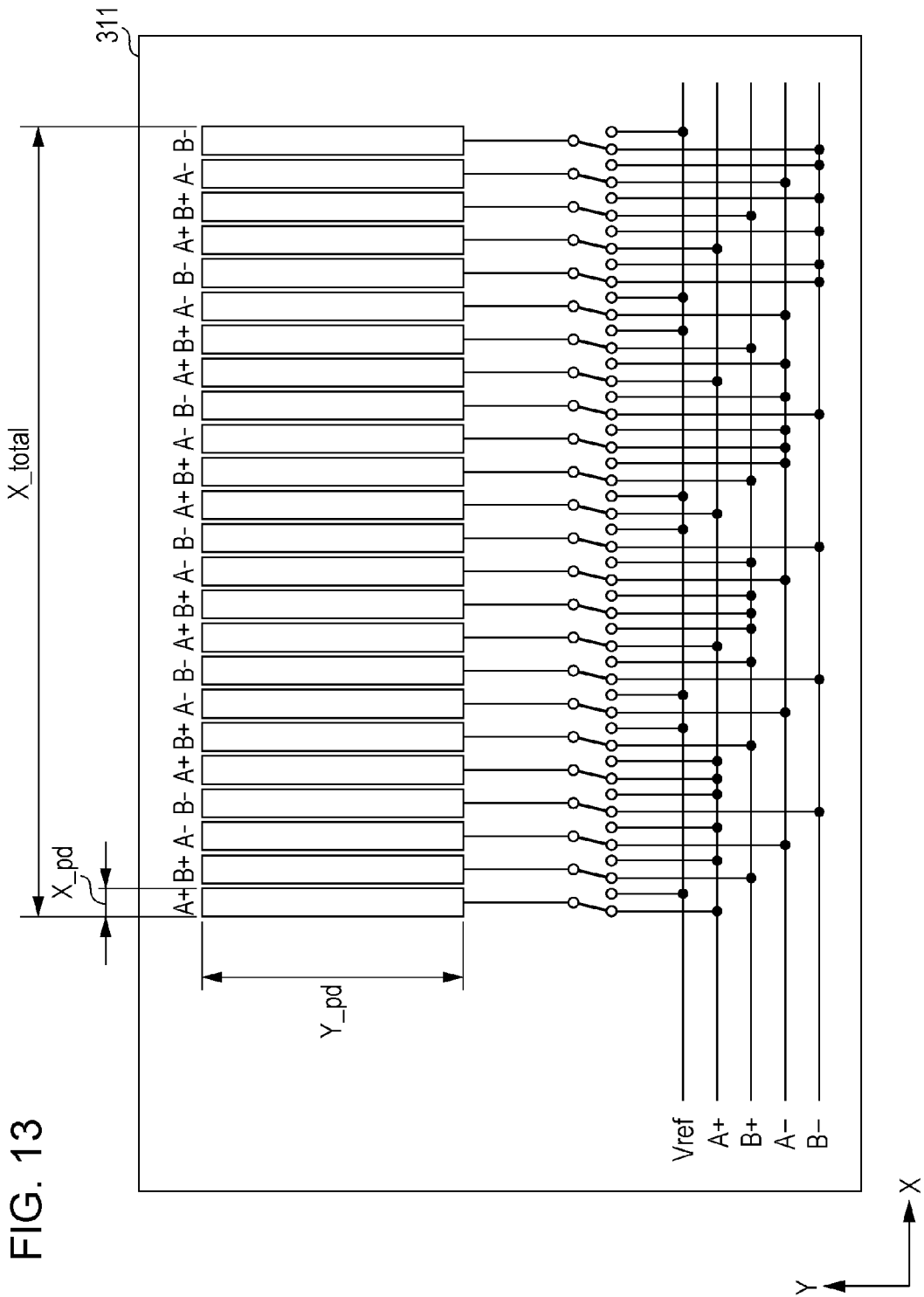
FIG. 13 is a plan view showing an arrangement of a photodiode array in high-resolution detection mode according to the third embodiment.
Figure 14:
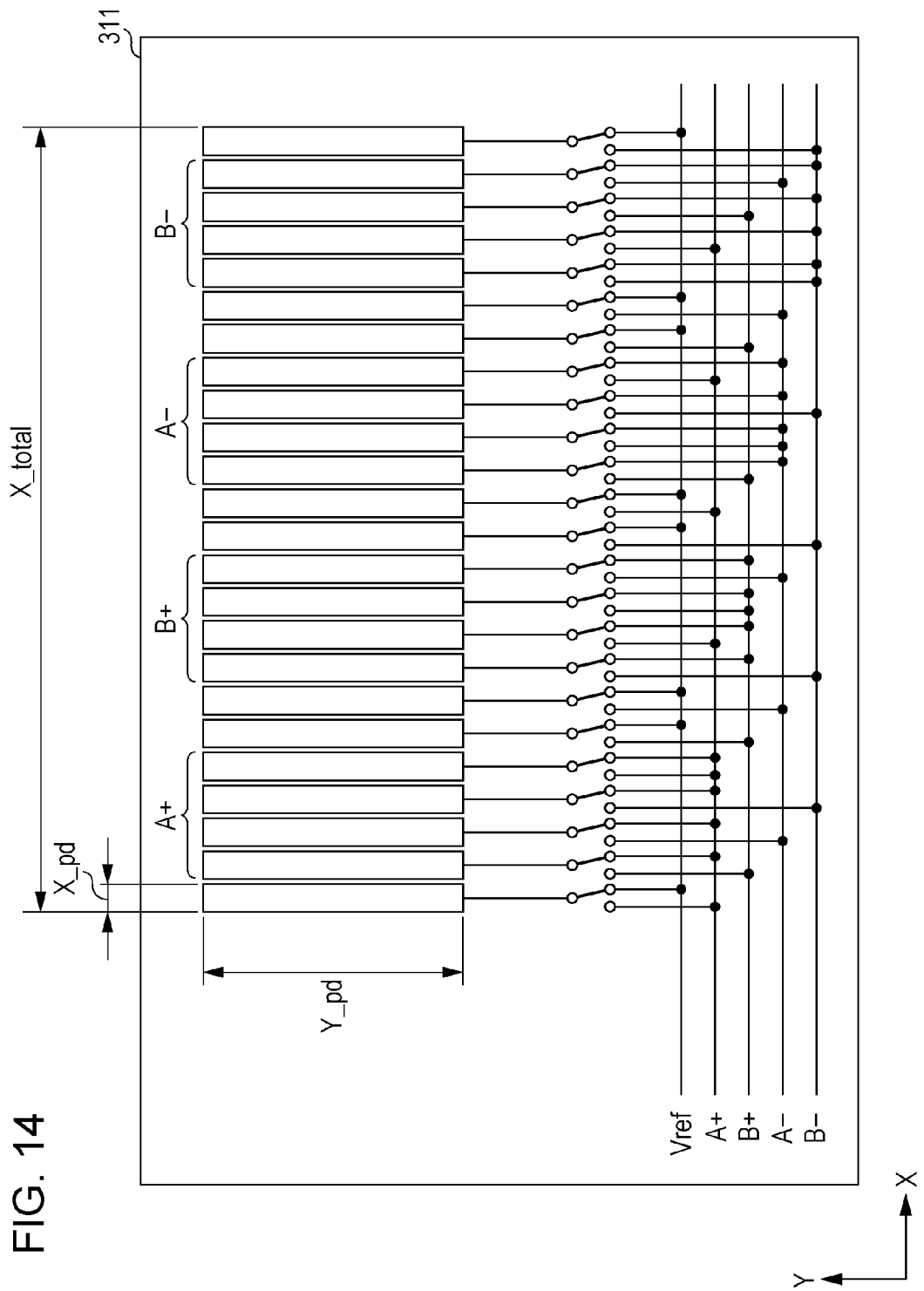
FIG. 14 is a plan view showing an arrangement of a photodiode array in low-resolution detection mode according to the third embodiment.

Next, an output signal of an encoder will be described. FIGS. 13 and 14 show a light receiving surface arrangement of the photodiode array 311. The arrangement of the light receiving surface of the photodiode array 312 is the same as that of the photodiode array 311. The photodiode array 311 has 24 photodiodes in a row at 50 μm pitch in the X axis direction. One photodiode has an X-direction width X_pd of 50 μm and a Y-direction width Y_pd of 800 μm. The total width X_total of the photodiode array 311 is 1200 μm.

The outputs from each of the photodiodes are connected to one of four IV conversion amplifiers in the next stage via the switch circuit. The outputs from the four IV conversion amplifiers respectively correspond to S(A+), S(B+), S(A−), and S(B−) of four-phase sine wave outputs. The switch circuit can switch connections by an input from the outside. When the input is high-level, as shown in FIG. 13, a detection pitch of scale pattern 100 μm (reflection image pitch of 200 μm) is set. When the input is low-level, as shown in FIG. 14, a detection pitch of scale pattern 600 μm (reflection image pitch of 1200 μm) is set.

At a detection pitch of 600 μm, every four adjacent photodiodes are electrically connected. Thereby, outputs in the width of 200 μm which corresponds to the reflection image pitch of the modulation component of the scale pattern of 100 μm pitch are summed up, so that it is possible to reduce effects of the modulation component of 100 μm pitch which affect the output. Although the fine pitch of the second track 202 is 101.4085 μm, a sufficient reduction effect of the modulation component can be obtained.

At a detection pitch of 100 μm, the total width of the photodiodes related to the signals is 1200 μm, which corresponds to the reflection image pitch of the modulation component of the scale pattern of 600 μm, so that it is possible to reduce effects of the fluctuation of the output amplitude that varies due to the modulation component of 600 μm pitch. Although the coarse pitch of the second track 202 is 608.4507 μm, a sufficient reduction effect of the modulation component can be obtained.

Regarding the relative phases of the four-phase sine wave with respect the detection pitch, if the relative phase of S(A+) is 0 degrees, the relative phase of S(B+) is +90 degrees, the relative phase of S(A−) is +180 degrees, and the relative phase of S(B−) is +270 degrees. The calculations below are performed using these outputs in the signal processing circuit 401, so that two-phase sinusoidal wave signals S(A) and S(B) from which a direct-current component is removed are formed. Further a phase signal is obtained by further performing an arctangent calculation on these signals.

$S(A)=S(A+)-S(A-)$ $S(B)=S(B+)-S(B-)$

When the input to the switch circuit is high (detection pitch is 100 μm), a phase signal of the first track is defined as $\phi 1$ and a phase signal of the second track is defined as $\phi 2$. When the input to the switch circuit is low (detection pitch is 600 μm), a phase signal of the first track is defined as $\phi 1'$ and a phase signal of the second track is defined as $\phi'$. Before and after switching the input to the switch circuit, the signals are obtained within a very small time interval, so that $\phi 1$, $\phi 2$, $\phi 1'$, and $\phi 2'$ at the same position can be obtained.

Phase signals P1, P2, P3, and P4 having pitches different from each other are generated by the calculations described below from the phase signals $\phi 1$, $\phi 2$, $\phi 1'$, and $\phi 2'$ obtained in the manner as described above.

$P1=\phi 1'-\phi 2'$ $P2=\phi 1-\phi 2$ $P3=\phi 1'$ $P4=\phi 1$

P1 is a periodic signal having a period of T1=43.2 mm and is defined as the most significant signal. P2 is a periodic signal having a period of T2=7.2 mm and is defined as the second significant signal. P3 is a periodic signal having a period of T3=0.6 mm and is defined as the third significant signal. P4 is a periodic signal having a period of T4=0.1 mm and is defined as the least significant signal. The subsequent processing is the same as that of the first embodiment, so that the description thereof is omitted. In the present embodiment, not only unnecessary diffracted light component that does not contribute to a signal is difficult to be generated, but also mutual interference between diffracted light components that contribute to a signal can be reduced, so that it is possible to reduce distortion of the sinusoidal wave signals.

Fourth Embodiment

Figure 15:
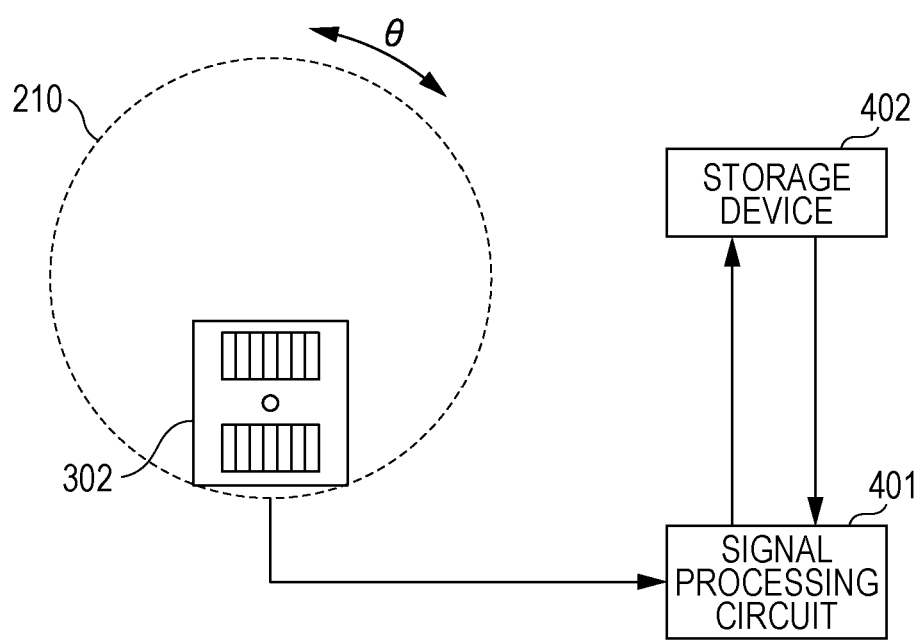
FIG. 15 is a schematic diagram showing a configuration of an optical rotary encoder according to a fourth embodiment.

The present embodiment is an optical rotary encoder whose displacement direction is a rotational direction. FIG. 15 shows a configuration of the optical rotary encoder. The encoder includes a rotary scale 210 attached to a rotatable portion, a sensor unit 302 attached to a fixed portion, a signal processing circuit 401, and a storage device 402. The signal processing circuit 401 performs interpolation processing of the encoder signal obtained by the sensor unit 302, reads and writes a signal from and to a storage device 402, and outputs a position signal.

Figure 16:
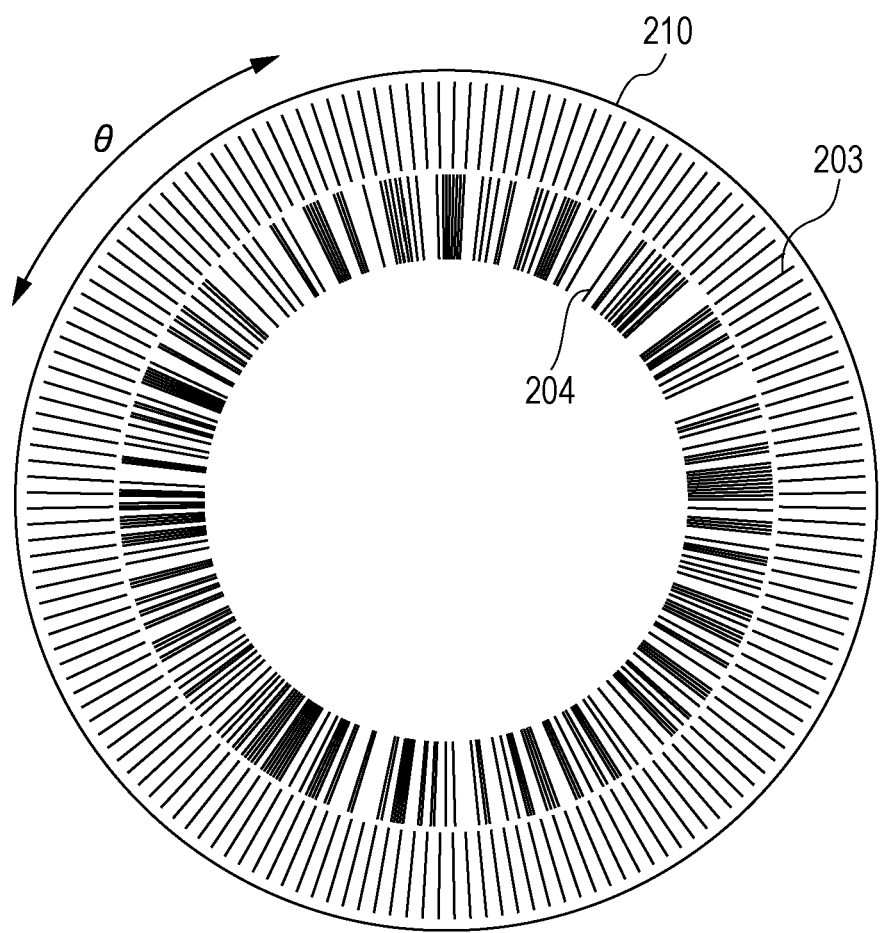
FIG. 16 is a diagram showing a track configuration of the optical rotary encoder according to the fourth embodiment.

FIG. 16 shows a track configuration of the rotary scale 210 according to the present embodiment. In the present embodiment, the rotary scale 210 includes an M-sequence track 204 formed of an M-sequence pattern which is a 9-bit absolute position detection pattern and a radial track 203. Here, the M-sequence is a code generated by feeding back logical exclusive OR outputted from a shift register. FIG. 17 shows an enlarged diagram of a part of the radial track 203. The radial track 201 has areas (areas C) in which reflective film slits are arranged at an equiangular interval P on both sides of the sensor scanning area. Further, the radial track 201 has an area (area D) formed of a reflective film pattern in which a boundary line between a reflective portion and a non-reflective portion is formed into a sinusoidal wave shape having a pitch of θ0=P×6 in the center portion of the sensor scanning area.

The radial direction width of the area D is 200 μm. The sensor unit 301 is positioned so that the sensor unit 301 reads a range including the radial width of the area D at all times. The equiangular interval P is 360/768 degrees and θ0 is 360/128 degrees.

Figure 18A:
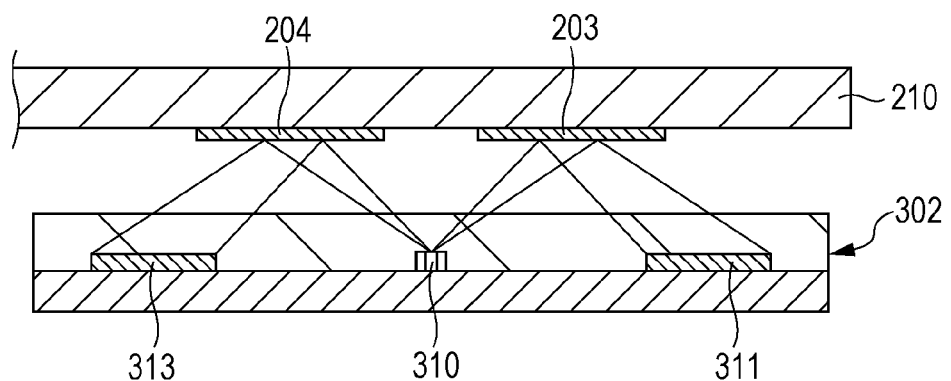
FIG. 18A is a side view showing a schematic configuration of a sensor unit according to the fourth embodiment.
Figure 18B:
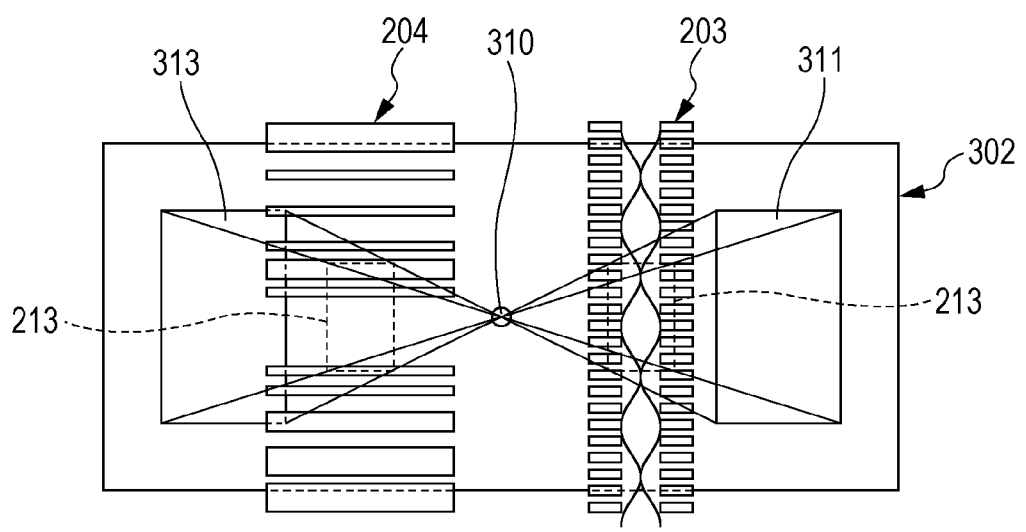
FIG. 18B is a top view showing a schematic configuration of the sensor unit according to the fourth embodiment.

The configuration of the sensor unit 302 will be described with reference to FIGS. 18A and 18B. FIG. 18A is a side view of the sensor unit 302. FIG. 18B is a top view of the sensor unit 302. The sensor unit 302 is a sensor unit in which an LED 310, a photodiode array 311, and an M-sequence photodiode array 313 are mounted in the same package so that a light emitting unit and a light receiving unit are integrated into one body. A divergent light flux emitted from the LED 310 in the sensor unit 302 is irradiated to the radial track 203 and the M-sequence track 204 on the rotary scale 210.

The light fluxes reflected from the radial track 203 and the M-sequence track 204 are respectively directed to the photodiode arrays 311 and the M-sequence photodiode array 313 in the sensor unit 302. The light fluxes are received on the photodiode arrays 311 and the M-sequence photodiode array 313 as two times enlarged images of the reflectivity distributions of the radial track 203 and the M-sequence track 204. In the M-sequence photodiode array 313, photodiodes having a width corresponding to a two times enlarged image of a minimum line width of the M-sequence are arranged so that the M-sequence photodiode array 313 can detect the M-sequence.

The light fluxes received by the photodiode array 311 and the M-sequence photodiode array 313 are converted into electrical signals and transmitted to the signal processing circuit 401 shown in FIG. 15 as encoder signals.

Regarding the absolute position detection, first, P1 (high-order signal) is obtained from the light flux reflected from the M-sequence track 204 which is an absolute position detection pattern. Subsequently, on the basis of absolute position information obtained from the absolute position detection pattern, an absolute position signal is synthesized and the resolution of the absolute position signal is raised sequentially.

Specifically, when the input to the switch circuit is low (detection pitch is 600 μm), a phase signal φ1' on the radial track 203 is obtained and defined as P2 (middle-order signal). When the input to the switch circuit is high (detection pitch is 100 μm), a phase signal φ1 on the radial track 203 is obtained and defined as P3 (low-order signal).

The high-order signal P1 is an absolute position signal of T1=1 period/1 rotation generated from the M-sequence pattern. The P2 is a periodic signal of T2=128 periods/1 rotation. The P3 is a periodic signal of T3=768 periods/1 rotation. The P1 is not a periodic signal, so that a 9-bit value is normalized to a value of 0 to 2π.

Next, a process for synthesizing an absolute position signal from the periodic signals will be described. First, an intermediate signal Q1 is obtained by the calculation described below.

$$Q1 = \text{Round}[(P1 - P1\_\text{offset}) - (P2 - P2\_\text{offset}) \times T2/T1] + (P2 - P2\_\text{offset}) \times T2/T1$$

Here, Round[ ] is a round-off (rounding) function.

Next, an absolute position signal S_abs is obtained as described below.

$$S\_\text{abs} = \text{Round}[Q1 - P3 \times T3/T1] + P3 \times T3/T1$$

The absolute position signal S_abs obtained in this way is outputted from the signal processing circuit.

The middle-order signal P2 is generated, so that a required degree of detection accuracy of the absolute position obtained from the M-sequence track is alleviated and the synthesis of the absolute position signal becomes easier. In the present embodiment, position detection of 600 μm pitch in the circumferential direction is an adequate degree of accuracy, so that, for example, even if the scale is attached eccentrically with respect to the rotation center by tens of micron meters, the effect of the eccentricity is allowable.

As described above, also in the rotary encoder, it is possible to generate the middle-order and low-order signals with less interpolation error and perform position detection with a high degree of accuracy by the same effects as those in the first embodiment.

Modified Example

Although, in the above embodiment, the reflectivity distribution of the scale is obtained by summing up a modulation component corresponding to the fine pitch pattern and a modulation component corresponding to the coarse pitch pattern, instead of the reflectivity distribution, the transmittance distribution of the scale may be obtained in the same manner as described above.

It is of course possible to appropriately combine technical components described in the above embodiment within the technical idea of the present invention.

The encoder (optical encoder) of the present invention can be applied to optical devices (an image pickup apparatus such as a camera, a lens apparatus for capturing images, a projection lens for a projector, a telescope, and the like) which includes optical elements (lens, mirror, and the like). In other words, an optical device as the present invention may be configured to include an optical element, a moving member that moves in conjunction with the movement of the optical element, and the above-described optical encoder that detects the position of the moving member.

According to the present invention, it is possible to prevent unnecessary spatial frequency components from being included when detecting positions of a fine pitch pattern and a coarse pitch pattern and perform separation of position detections of the fine pitch pattern and the coarse pitch pattern with a higher degree of accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-042073 filed Feb. 28, 2011, which is hereby incorporated by reference herein in its entirety.

What is claimed is:
1. An optical encoder comprising:
a light source;
a scale configured to be irradiated by the light source and have a fine pitch pattern whose transmittance or reflectivity changes periodically within a first period in a measuring direction and a coarse pitch pattern whose transmittance or reflectivity changes periodically within a second period which is longer than the first period;
a detection sensor array including a plurality of sensor elements arranged along the measuring direction,
wherein
the detection sensor array is operable under a high resolution detection mode for reading out a signal corresponding to the fine pitch pattern and a low resolution detection mode for reading out a signal corresponding to the coarse pitch pattern,
wherein
each sensor element within the plurality of sensor elements is configured to receive both lights from the fine pitch pattern and the coarse pitch pattern,
wherein
a transmittance distribution or a reflectivity distribution of the scale is a distribution obtained by summing up a modulation component which corresponds to the fine pitch pattern and a modulation component which corresponds to the coarse pitch pattern,
wherein
the fine pitch pattern and the coarse pitch pattern are arranged in a direction perpendicular to the measuring direction.

2. The optical encoder according to claim 1, wherein
a width of the high resolution detection sensor array in the measuring direction is an integral multiple of a pitch of the reflection image of the coarse pitch pattern on the detection sensor array.

3. The optical encoder according to claim 2, wherein
the width of the high resolution detection sensor array in the measuring direction is the same as the pitch of the reflection image of the coarse pitch pattern on the detection sensor array.

4. The optical encoder according to claim 1, wherein
the detection sensor array is connected to a signal processing circuit that obtains a four-phase sine wave output and removes an unnecessary frequency component on the basis of the four-phase sine wave output.

5. The optical encoder according to claim 1, wherein
the first sensor elements used in the high resolution detection mode within the sensor elements are formed by a first width and a first pitch in the measuring direction,
the second sensor elements used in the low resolution detection mode within the sensor elements are formed by a second width that is an integral multiple of the first width and a second pitch that is an integral multiple of the first pitch in the measuring direction, and
the optical encoder includes a switch configured to switch between the high resolution detection mode and the low resolution detection mode.

6. The optical encoder according to claim 1, wherein
the scale further includes an absolute position detection pattern, and
on the basis of absolute position information obtained from the absolute position detection pattern, an absolute position signal is synthesized based on outputs from the detection sensor array.

7. The optical encoder according to claim 1, further comprising:
another scale on which another fine pattern having a different pitch from that of the fine pattern and another coarse pattern having a different pitch from that of the coarse pattern are formed,
wherein the optical encoder can operate in a high resolution detection mode in which position detection is performed by detecting light from the fine pitch pattern and the other fine pitch pattern and a low resolution detection mode in which detection, whose resolution is lower than that of the high resolution detection mode, is performed by detecting light from the coarse pitch pattern and the other coarse pitch pattern.

8. The optical encoder according to claim 1, wherein
unused sensors in the low resolution detection mode, which are not used to detect position, are connected to GND.

9. The optical encoder according to claim 1, wherein
the measuring direction is a rotational direction.

10. The optical encoder according to claim 1, wherein
a pitch of the coarse pitch pattern is an odd multiple of a pitch of the fine pitch pattern.

11. The optical encoder according to claim 1, wherein an amplitude of the modulation component which corresponds to the fine pitch pattern is uniform in the measuring direction, and an amplitude of the modulation component which corresponds to the coarse pitch pattern is uniform in the measuring direction.

12. An optical device comprising:
an optical element;
a moving member arranged to move in conjunction with a movement of the optical element; and
an optical encoder arranged to detect a position of the moving member,
wherein the optical encoder including
a light source;
a scale configured to be irradiated by the light source and have a fine pitch pattern whose transmittance or reflectivity changes periodically within a first period in a measuring direction and a coarse pitch pattern whose transmittance or reflectivity changes periodically within a second period which is longer than the first period;
a detection sensor array including a plurality of sensor elements arranged along the measuring direction,
wherein
the detection sensor array is operable under a high resolution detection mode for reading out a signal corresponding to the fine pitch pattern and a low resolution detection mode for reading out a signal corresponding to the coarse pitch pattern,
wherein
each sensor element within the plurality of sensor elements is configured to receive both lights from the fine pitch pattern and the coarse pitch pattern,
wherein
a transmittance distribution or a reflectivity distribution of the scale is a distribution obtained by summing up a modulation component which corresponds to the fine pitch pattern and a modulation component which corresponds to the coarse pitch pattern
wherein
the fine pitch pattern and the coarse pitch pattern are arranged in a direction perpendicular to the measuring direction.

13. An optical encoder comprising:
a light source;
a scale configured to be irradiated by the light source and have a fine pitch pattern whose transmittance or reflectivity changes periodically within a first period in a measuring direction and a coarse pitch pattern whose transmittance or reflectivity changes periodically within a second period which is longer than the first period;
a detection sensor array including a plurality of sensor elements arranged along the measuring direction, wherein
- the detection sensor array is operable under a high resolution detection mode of reading a signal corresponding to the fine pitch pattern and a low resolution detection mode of reading a signal corresponding to the coarse pitch pattern, wherein
- each sensor element within the plurality of sensor elements is configured to receive both lights from the fine pitch pattern and the coarse pitch pattern, wherein
- the fine pitch pattern and the coarse pitch pattern are arranged in a direction perpendicular to the measuring direction.

14. The optical encoder according to claim 13, wherein the transmittance distribution or the reflectivity distribution of the scale is a distribution obtained by summing up a first distribution in which a transmittance or a reflectivity changes with displacement in the scale along the measuring direction in the first period and a second distribution in which a transmittance or a reflectivity changes with displacement in the scale along the measuring direction in the second period.

15. The optical encoder according to claim 14, wherein the change along the measuring direction is obtained by summing up the change of the transmittance or the reflectivity along the measuring direction of the fine pitch pattern, and the change of the transmittance or the reflectivity along the measuring direction of the coarse pitch pattern.

16. An optical device comprising:
an optical element;
a moving member arranged to move in conjunction with a movement of the optical element; and
an optical encoder arranged to detect a position of the moving member, wherein the optical encoder including
a light source;
a scale configured to be irradiated by the light source and have a fine pitch pattern whose transmittance or reflectivity changes periodically within a first period in a measuring direction and a coarse pitch pattern whose transmittance or reflectivity changes periodically within a second period which is longer than the first period;
a detection sensor array including a plurality of sensor elements arranged along the measuring direction, wherein
- the detection sensor array is operable under a high resolution detection mode of reading a signal corresponding to the fine pitch pattern and a low resolution detection mode of reading a signal corresponding to the coarse pitch pattern, wherein
- each sensor element within the plurality of sensor elements is configured to receive both lights from the fine pitch pattern and the coarse pitch pattern, wherein
- the fine pitch pattern and the coarse pitch pattern are arranged in a direction perpendicular to the measuring direction.

* * * * *